(12) United States Patent
Lord et al.

(10) Patent No.: US 9,368,028 B2
(45) Date of Patent: Jun. 14, 2016

(54) DETERMINING THREATS BASED ON INFORMATION FROM ROAD-BASED DEVICES IN A TRANSPORTATION-RELATED CONTEXT

(75) Inventors: Richard T. Lord, Tacoma, WA (US); Robert W. Lord, Seattle, WA (US); Nathan P. Myhrvold, Medina, WA (US); Clarence T. Tegreene, Bellevue, WA (US); Roderick A. Hyde, Redmond, WA (US); Lowell L. Wood, Jr., Bellevue, WA (US); Muriel Y. Ishikawa, Livermore, CA (US); Victoria Y. H. Wood, Livermore, CA (US); Charles Whitmer, North Bend, WA (US); Paramvir Bahl, Bellevue, WA (US); Douglas C. Burger, Bellevue, WA (US); Ranveer Chandra, Kirkland, WA (US); William H. Gates, III, Medina, WA (US); Paul Holman, Seattle, WA (US); Jordin T. Kare, Seattle, WA (US); Craig J. Mundie, Seattle, WA (US); Tim Paek, Sammamish, WA (US); Desney S. Tan, Kirkland, WA (US); Lin Zhong, Houston, TX (US); Matthew G. Dyor, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 795 days.

(21) Appl. No.: 13/425,210

(22) Filed: Mar. 20, 2012

(65) Prior Publication Data

US 2013/0141576 A1 Jun. 6, 2013

Related U.S. Application Data

(63) Continuation-in-part of application No. 13/309,248, filed on Dec. 1, 2011, now Pat. No. 8,811,638, and a continuation-in-part of application No. 13/324,232, filed on Dec. 13, 2011, now Pat. No. 8,934,652, and a (Continued)

(51) Int. Cl.
*G08G 1/04* (2006.01)
*G08G 1/042* (2006.01)

(Continued)

(52) U.S. Cl.
CPC .............. *G08G 1/04* (2013.01); *G02B 27/017* (2013.01); *G08G 1/042* (2013.01); *G08G 1/052* (2013.01);

(Continued)

(58) Field of Classification Search
CPC ......... G08G 1/164; G08G 1/04; G08G 1/042; G08G 1/052; G08G 1/056; G08G 1/087; G08G 1/096716; G08G 1/096741; G08G 1/096775; G08G 1/096791; G08G 1/162; B60T 17/22; B60T 2201/022; B60T 2210/36; B60T 7/22; B60W 2550/00; B60W 30/09; G01S 3/802; G02B 2027/0138; G02B 2027/014; G02B 27/017
USPC ......................................................... 348/148
See application file for complete search history.

(56) References Cited

U.S. PATENT DOCUMENTS

| | | | |
|---|---|---|---|
| 5,239,586 A | | 8/1993 | Marui |
| 5,515,026 A | * | 5/1996 | Ewert ........................... 340/436 |

(Continued)

OTHER PUBLICATIONS

Menon, Arvind et al; "Roadside Range Sensors for Intersection Decision Support"; bearing a date of Apr. 1, 2004; IEEE; pp. 1-6.

*Primary Examiner* — Mohammed Rahaman
(74) *Attorney, Agent, or Firm* — Steve Wight; Sandy Swain; Micky Minhas

(57) ABSTRACT

Techniques for ability enhancement are described. Some embodiments provide an ability enhancement facilitator system ("AEFS") configured to enhance a user's ability to operate or function in a transportation-related context as a pedestrian or a vehicle operator. In one embodiment, the AEFS is configured to perform vehicular threat detection based on information received at a road-based device, such as a sensor or processor that is deployed at the side of a road. An example AEFS receives, at a road-based device, information about a first vehicle that is proximate to the road-based device. The AEFS analyzes the received information to determine threat information, such as that the vehicle may collide with the user. The AEFS then informs the user of the determined threat information, such as by transmitting a warning to a wearable device configured to present the warning to the user.

47 Claims, 44 Drawing Sheets

Related U.S. Application Data continuation-in-part of application No. 13/340,143, filed on Dec. 29, 2011, and a continuation-in-part of application No. 13/356,419, filed on Jan. 23, 2012, and a continuation-in-part of application No. 13/362,823, filed on Jan. 31, 2012, and a continuation-in-part of application No. 13/397,289, filed on Feb. 15, 2012, and a continuation-in-part of application No. 13/407,570, filed on Feb. 28, 2012.

(51) Int. Cl.
```
G08G 1/052      (2006.01)
G08G 1/056      (2006.01)
G08G 1/087      (2006.01)
G08G 1/0967     (2006.01)
G08G 1/16       (2006.01)
G02B 27/01      (2006.01)
G01S 3/802      (2006.01)
```

(52) U.S. Cl.
CPC .............. *G08G 1/056* (2013.01); *G08G 1/087* (2013.01); *G08G 1/096716* (2013.01); *G08G 1/096741* (2013.01); *G08G 1/096775* (2013.01); *G08G 1/096791* (2013.01); *G08G 1/162* (2013.01); *G08G 1/164* (2013.01); *G01S 3/802* (2013.01); *G02B 2027/014* (2013.01); *G02B 2027/0138* (2013.01)

(56) References Cited

U.S. PATENT DOCUMENTS

| | | | |
|---|---|---|---|
| 5,983,161 A * | 11/1999 | Lemelson et al. | 701/301 |
| 5,995,898 A | 11/1999 | Tuttle | |
| 6,226,389 B1 | 5/2001 | Lemelson et al. | |
| 6,304,648 B1 | 10/2001 | Chang | |
| 6,326,903 B1 * | 12/2001 | Gross et al. | 340/988 |
| 6,529,866 B1 | 3/2003 | Cope et al. | |
| 6,628,767 B1 | 9/2003 | Wellner et al. | |
| 6,731,202 B1 | 5/2004 | Klaus | |
| 6,944,474 B2 | 9/2005 | Rader et al. | |
| 7,224,981 B2 | 5/2007 | Deisher et al. | |
| 7,324,015 B1 | 1/2008 | Allen et al. | |
| 7,606,444 B1 | 10/2009 | Erol et al. | |
| 7,783,022 B1 | 8/2010 | Jay et al. | |
| 8,050,917 B2 | 11/2011 | Caspi et al. | |
| 8,352,245 B1 | 1/2013 | Lloyd | |
| 8,369,184 B2 | 2/2013 | Calhoun | |
| 8,618,952 B2 | 12/2013 | Mochizuki | |
| 8,669,854 B2 | 3/2014 | D'Ambrosio et al. | |
| 2002/0021799 A1 | 2/2002 | Kaufholz | |
| 2002/0196134 A1 | 12/2002 | Lutter et al. | |
| 2003/0009277 A1 * | 1/2003 | Fan et al. | 701/117 |
| 2003/0139881 A1 | 7/2003 | Miller et al. | |
| 2003/0158900 A1 | 8/2003 | Santos | |
| 2004/0064322 A1 | 4/2004 | Georgiopoulos et al. | |
| 2004/0100868 A1 | 5/2004 | Patterson, Jr. et al. | |
| 2004/0122678 A1 | 6/2004 | Rousseau | |
| 2004/0172252 A1 | 9/2004 | Aoki et al. | |
| 2004/0230651 A1 | 11/2004 | Ivashin | |
| 2004/0263610 A1 | 12/2004 | Whynot et al. | |
| 2005/0010407 A1 | 1/2005 | Jaroker | |
| 2005/0018828 A1 | 1/2005 | Nierhaus et al. | |
| 2005/0038648 A1 | 2/2005 | Ju et al. | |
| 2005/0041529 A1 | 2/2005 | Schliep et al. | |
| 2005/0088981 A1 | 4/2005 | Woodruff et al. | |
| 2005/0135583 A1 | 6/2005 | Kardos | |
| 2005/0207554 A1 | 9/2005 | Ortel | |
| 2005/0222769 A1 * | 10/2005 | Simon | 701/300 |
| 2006/0080004 A1 * | 4/2006 | Cheok et al. | 701/1 |
| 2006/0195850 A1 | 8/2006 | Knight et al. | |
| 2007/0118498 A1 | 5/2007 | Song et al. | |
| 2008/0061958 A1 | 3/2008 | Birk et al. | |
| 2008/0117838 A1 | 5/2008 | Yee et al. | |
| 2008/0195387 A1 | 8/2008 | Zigel et al. | |
| 2008/0270132 A1 | 10/2008 | Navratil et al. | |
| 2008/0300777 A1 | 12/2008 | Fehr et al. | |
| 2009/0040037 A1 | 2/2009 | Schraga | |
| 2009/0070102 A1 | 3/2009 | Maegawa | |
| 2009/0119324 A1 | 5/2009 | Simard et al. | |
| 2009/0198735 A1 | 8/2009 | Yu et al. | |
| 2009/0204620 A1 | 8/2009 | Thione et al. | |
| 2009/0271176 A1 | 10/2009 | Bodin et al. | |
| 2009/0281789 A1 | 11/2009 | Waibel et al. | |
| 2009/0282103 A1 | 11/2009 | Thakkar et al. | |
| 2009/0306957 A1 | 12/2009 | Gao et al. | |
| 2009/0307616 A1 | 12/2009 | Nielsen | |
| 2010/0040217 A1 | 2/2010 | Aberg et al. | |
| 2010/0135478 A1 | 6/2010 | Wald et al. | |
| 2010/0153497 A1 | 6/2010 | Sylvain et al. | |
| 2010/0185434 A1 | 7/2010 | Burvall et al. | |
| 2010/0222098 A1 | 9/2010 | Garg | |
| 2010/0315218 A1 | 12/2010 | Cades et al. | |
| 2011/0010041 A1 | 1/2011 | Wagner et al. | |
| 2011/0153324 A1 | 6/2011 | Ballinger et al. | |
| 2011/0184721 A1 | 7/2011 | Subramanian et al. | |
| 2011/0196580 A1 | 8/2011 | Xu et al. | |
| 2011/0237295 A1 | 9/2011 | Bartkowiak et al. | |
| 2011/0270922 A1 | 11/2011 | Jones et al. | |
| 2011/0307241 A1 | 12/2011 | Waibel et al. | |
| 2012/0010886 A1 | 1/2012 | Razavilar | |
| 2012/0025965 A1 | 2/2012 | Mochizuki et al. | |
| 2012/0046833 A1 | 2/2012 | Sanma et al. | |
| 2012/0069131 A1 | 3/2012 | Abelow | |
| 2012/0072109 A1 | 3/2012 | Waite et al. | |
| 2012/0075407 A1 | 3/2012 | Wessling | |
| 2012/0197629 A1 | 8/2012 | Nakamura et al. | |
| 2012/0323575 A1 | 12/2012 | Gibbon et al. | |
| 2013/0021950 A1 | 1/2013 | Chen et al. | |
| 2013/0022189 A1 | 1/2013 | Ganong, III et al. | |
| 2013/0057691 A1 | 3/2013 | Atsmon et al. | |
| 2013/0058471 A1 | 3/2013 | Garcia | |
| 2013/0063542 A1 | 3/2013 | Bhat et al. | |
| 2013/0103399 A1 | 4/2013 | Gammon | |
| 2013/0204616 A1 | 8/2013 | Aoki et al. | |
| 2014/0055242 A1 | 2/2014 | Mendonca et al. | |

\* cited by examiner

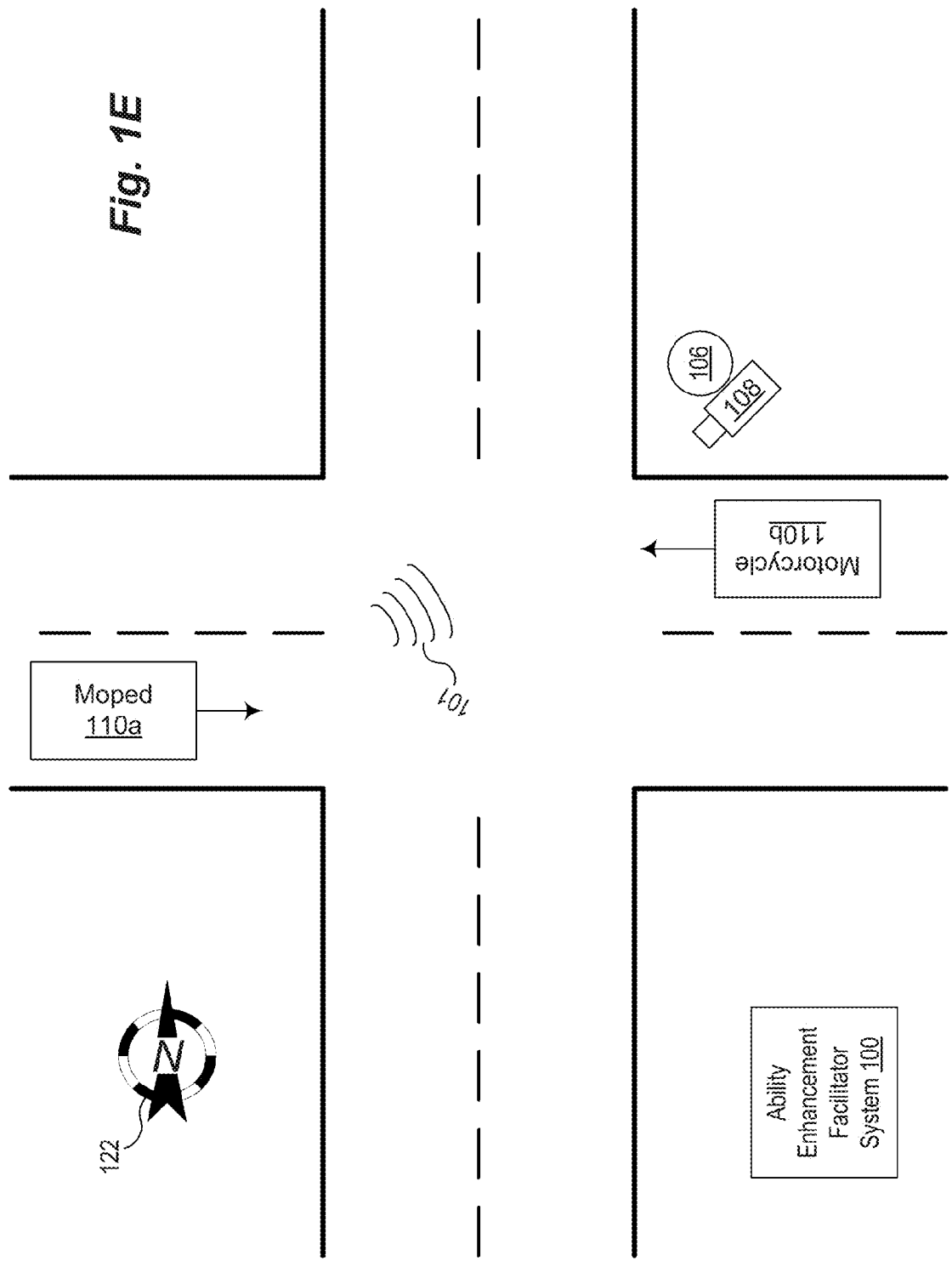

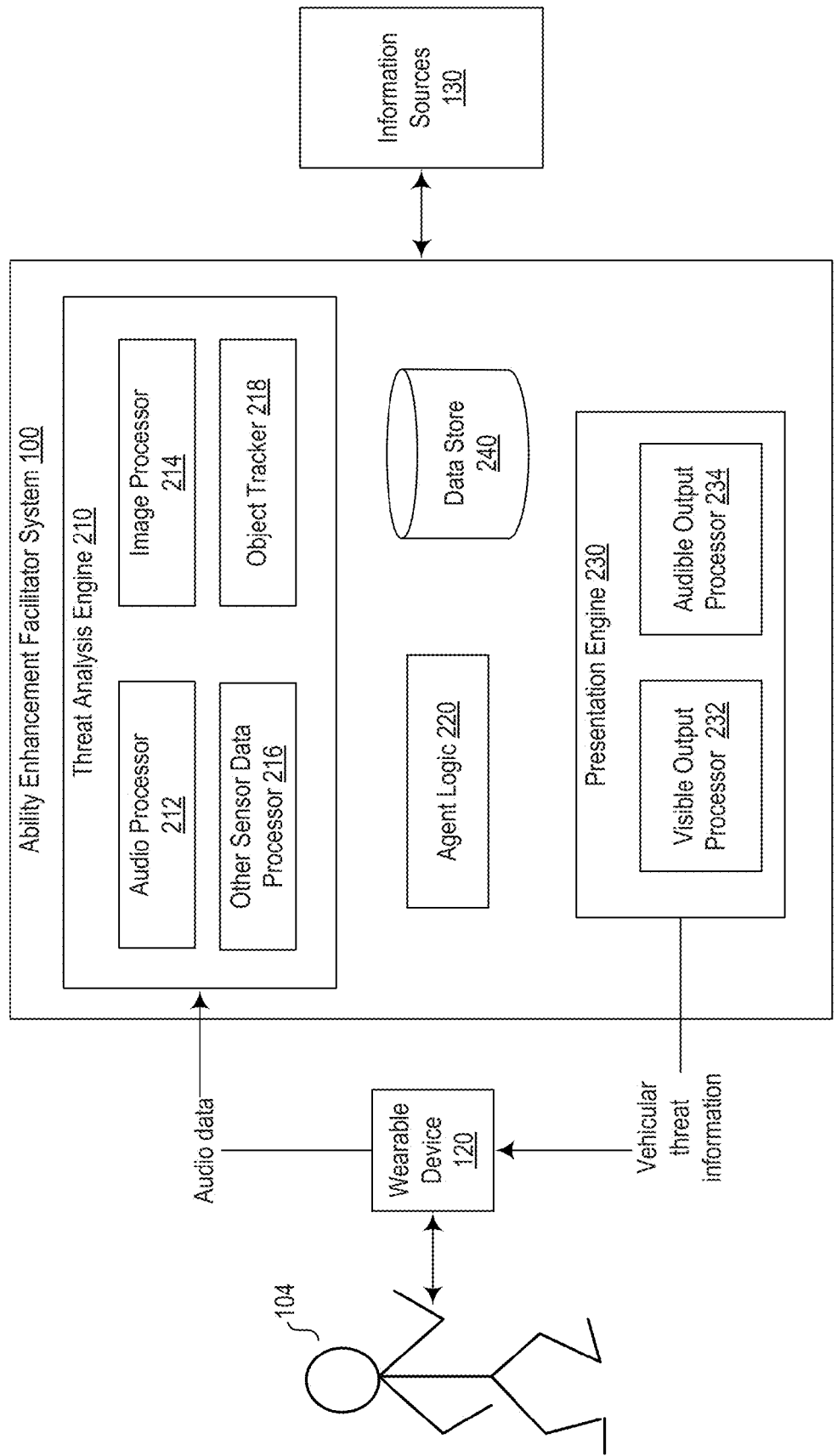

Fig. 3.1

3.100: A process for enhancing ability in a transportation-related context 3.103: at a road-based device, receiving information about a first vehicle that is proximate to the road-based device

3.106: determining threat information based at least in part on the information about the first vehicle

3.109: presenting the threat information via a wearable device of a user

Fig. 3.2

3.200: The process of 3.100, wherein the determining threat information includes:

3.202: determining a threat posed by the first vehicle to the user

Fig. 3.3

3.300: The process of 3.100, wherein the determining threat information includes:

3.302: determining a threat posed by the first vehicle to some other entity besides the user

Fig. 3.4

3.400: The process of 3.100, wherein the determining threat information includes:

> 3.402: determining a threat posed by a vehicle occupied by the user to the first vehicle

Fig. 3.5

3.500: The process of 3.100, wherein the determining threat information includes:

> 3.502: determining a threat posed by a vehicle occupied by the user to some other entity besides the first vehicle

Fig. 3.6

3.600: The process of 3.100, wherein the determining threat information includes:

> 3.602: determining a likelihood that the first vehicle will collide with some other object

Fig. 3.7

3.700: The process of 3.600, wherein the determining a likelihood that the first vehicle will collide with some other object includes:

> 3.702: determining a likelihood that the first vehicle will collide with the user

Fig. 3.8

3.800: The process of 3.600, wherein the determining a likelihood that the first vehicle will collide with some other object includes:

> 3.802: determining that the likelihood that the first vehicle will collide with some other object is greater than a threshold

Fig. 3.9

3.900: The process of 3.100, wherein the determining threat information includes:

> 3.902: determining that the first vehicle is driving erratically

Fig. 3.10

3.1000: The process of 3.100, wherein the determining threat information includes:

> 3.1002: determining that the first vehicle is driving with excessive speed

Fig. 3.11

3.1100: The process of 3.1000, wherein the determining that the first vehicle is driving with excessive speed includes:

> 3.1102: determining that the first vehicle is traveling more than a threshold percentage faster than an average speed of traffic on a road segment

Fig. 3.12

3.1200: The process of 3.1000, wherein the determining that the first vehicle is driving with excessive speed includes:

> 3.1202: determining that the first vehicle is traveling at a speed that is more than a threshold number of standard deviations over an average speed of traffic on a road segment

Fig. 3.13

3.1300: The process of 3.100, wherein the road-based device is a sensor attached to a structure proximate to the first vehicle

Fig. 3.14

3.1400: The process of 3.1300, wherein the structure proximate to the first vehicle is one of a utility pole, a traffic control signal support, and/or a building

Fig. 3.15

3.1500: The process of 3.1300, wherein the receiving information about a first vehicle includes:

> 3.1502: receiving an image of the first vehicle from a camera deployed at an intersection

Fig. 3.16

3.1600: The process of 3.1300, wherein the receiving information about a first vehicle includes:

3.1602: receiving ranging data from a range sensor deployed at an intersection, the ranging data representing a distance between the first vehicle and the intersection

Fig. 3.17

3.1700: The process of 3.1300, wherein the road-based device includes a camera

Fig. 3.18

3.1800: The process of 3.1300, wherein the road-based device includes a microphone

Fig. 3.19

3.1900: The process of 3.1300, wherein the road-based device includes a radar-based speed sensor

Fig. 3.20

3.2000: The process of 3.1300, wherein the road-based device includes a light detection and ranging-based speed sensor

Fig. 3.21

3.2100: The process of 3.1300, wherein the road-based device includes a range sensor

Fig. 3.22

3.2200: The process of 3.1300, wherein the road-based device includes a receiver operable to receive motion-related information transmitted from the first vehicle, the motion-related information including at least one of a position of the first vehicle, a velocity of the first vehicle, and/or a trajectory of the first vehicle

Fig. 3.23

3.2300: The process of 3.100, wherein the road-based device is embedded in a roadway being traveled over by the first vehicle

Fig. 3.24

3.2400: The process of 3.2300, wherein the road-based device includes one or more induction loops embedded in the roadway, the one or more induction loops configured to detect the presence and/or velocity of the first vehicle

Fig. 3.25

3.2500: The process of 3.2400, wherein the receiving information about a first vehicle includes:

> 3.2502: receiving motion-related information from the induction loop, the motion-related information including at least one of a position of the first vehicle, a velocity of the first vehicle, and/or a trajectory of the first vehicle

Fig. 3.26

3.2600: The process of 3.100, wherein the receiving information about a first vehicle includes:

> 3.2602: receiving the information about the first vehicle from a sensor attached to the first vehicle

Fig. 3.27

3.2700: The process of 3.100, wherein the receiving information about a first vehicle includes:

> 3.2702: receiving the information about the first vehicle from a sensor attached to a second vehicle

Fig. 3.28

3.2800: The process of 3.2700, wherein the second vehicle is an aerial vehicle

Fig. 3.29

3.2900: The process of 3.2700, wherein the second vehicle is a satellite

Fig. 3.30

3.3000: The process of 3.100, wherein the receiving information about a first vehicle includes:

> 3.3002:receiving the information about the first vehicle from a sensor attached to a vehicle that is occupied by the user

Fig. 3.31

3.3100: The process of 3.100, wherein the receiving information about a first vehicle includes:

> 3.3102:receiving the information about the first vehicle from a sensor attached to a vehicle that is operating autonomously

Fig. 3.32

3.3200: The process of 3.100, wherein the receiving information about a first vehicle includes:

> 3.3202:receiving the information about the first vehicle from a sensor of the wearable device

Fig. 3.33

3.3300: The process of 3.100, further comprising:

3.3302: receiving motion-related information about the first vehicle and/or other objects moving about a roadway

Fig. 3.34

3.3400: The process of 3.3300, wherein the receiving motion-related information includes:

3.3402: receiving position information from a position sensor of the first vehicle

Fig. 3.35

3.3500: The process of 3.3300, wherein the receiving motion-related information includes:

3.3502: receiving velocity information from a velocity sensor of the first vehicle

Fig. 3.36

3.3600: The process of 3.3300, wherein the determining threat information includes:

3.3602: determining the threat information based on the motion-related information about the first vehicle

Fig. 3.37

3.3700: The process of 3.3600, wherein the determining the threat information based on the motion-related information about the first vehicle includes:

> 3.3702: determining the threat information based on information about position, velocity, and/or acceleration of the user obtained from sensors in the wearable device

Fig. 3.38

3.3800: The process of 3.3600, wherein the determining the threat information based on the motion-related information about the first vehicle includes:

> 3.3802: determining the threat information based on information about position, velocity, and/or acceleration of the user obtained from devices in a vehicle of the user

Fig. 3.39

3.3900: The process of 3.3600, wherein the determining the threat information based on the motion-related information about the first vehicle includes:

> 3.3902: determining the threat information based on information about position, velocity, and/or acceleration of the first vehicle obtained from devices of the first vehicle

Fig. 3.40

3.4000: The process of 3.100, wherein the receiving information about a first vehicle includes:

> 3.4002: receiving image data from a camera, the image data representing an image of the first vehicle

Fig. 3.41

3.4100: The process of 3.4000, wherein the receiving image data from a camera includes:

> 3.4102: receiving an image from a camera that is attached to one of a road-side structure, the first vehicle, a second vehicle, a vehicle occupied by the user, or the wearable device

Fig. 3.42

3.4200: The process of 3.4000, wherein the receiving image data from a camera includes:

> 3.4202: receiving video data that includes multiple images of the first vehicle taken at different times

Fig. 3.43

3.4300: The process of 3.4200, wherein the receiving video data that includes multiple images of the first vehicle taken at different times includes:

> 3.4302: receiving a first image of the first vehicle taken at a first time
>
> 
>
> 3.4303: receiving a second image of the first vehicle taken at a second time, wherein the first and second times are sufficiently different such that velocity and/or direction of travel of the first vehicle may be determined with respect to positions of the first vehicle shown in the first and second images

Fig. 3.44

3.4400: The process of 3.4000, wherein the determining threat information includes:

> 3.4402: identifying the first vehicle in the image data

Fig. 3.45

3.4500: The process of 3.4000, wherein the determining threat information includes:

> 3.4502: determining whether the first vehicle is moving towards the user based on multiple images represented by the image data

*Fig. 3.46*

3.4600: The process of 3.4000, wherein the determining threat information includes:

> 3.4602:determining motion-related information about the first vehicle, based on one or more images of the first vehicle

*Fig. 3.47*

3.4700: The process of 3.4600, wherein the determining motion-related information about the first vehicle includes:

> 3.4702:determining the motion-related information with respect to timestamps associated with the one or more images

*Fig. 3.48*

3.4800: The process of 3.4600, wherein the determining motion-related information about the first vehicle includes:

> 3.4802:determining a position of the first vehicle

*Fig. 3.49*

3.4900: The process of 3.4600, wherein the determining motion-related information about the first vehicle includes:

> 3.4902:determining a velocity of the first vehicle

Fig. 3.50

3.5000: The process of 3.4900, wherein the determining a velocity of the first vehicle includes:

> 3.5002:determining the velocity with respect to a fixed frame of reference

Fig. 3.51

3.5100: The process of 3.4900, wherein the determining a velocity of the first vehicle includes:

> 3.5102:determining the velocity with respect to a frame of reference of the user

Fig. 3.52

3.5200: The process of 3.4600, wherein the determining motion-related information about the first vehicle includes:

> 3.5202:determining a direction of travel of the first vehicle

Fig. 3.53

3.5300: The process of 3.4600, wherein the determining motion-related information about the first vehicle includes:

> 3.5302:determining acceleration of the first vehicle

Fig. 3.54

3.5400: The process of 3.4600, wherein the determining motion-related information about the first vehicle includes:

> 3.5402: determining mass of the first vehicle

Fig. 3.55

3.5500: The process of 3.4000, wherein the determining threat information includes:

> 3.5502: identifying objects other than the first vehicle in the image data

Fig. 3.56

3.5600: The process of 3.4000, wherein the determining threat information includes:

> 3.5602: determining driving conditions based on the image data

Fig. 3.57

3.5700: The process of 3.100, wherein the receiving information about a first vehicle includes:

> 3.5702: receiving data representing an audio signal emitted or reflected by the first vehicle

Fig. 3.58

3.5800: The process of 3.5700, wherein the receiving data representing an audio signal emitted or reflected by the first vehicle includes:

> 3.5802: receiving data obtained at a microphone array that includes multiple microphones

Fig. 3.59

3.5900: The process of 3.5800, wherein the receiving data obtained at a microphone array includes:

> 3.5902: receiving data obtained at a microphone array, the microphone array coupled to a road-side structure

Fig. 3.60

3.6000: The process of 3.5700, wherein the determining threat information includes:

> 3.6002: determining the threat information based on the data representing the audio signal

Fig. 3.61

3.6100: The process of 3.6000, wherein the determining the threat information based on the data representing the audio signal includes:

> 3.6102: performing acoustic source localization to determine a position of the first vehicle based on multiple audio signals received via multiple microphones

Fig. 3.62

3.6200: The process of 3.6100, wherein the performing acoustic source localization includes:

3.6202: receiving an audio signal via a first one of the multiple microphones, the audio signal representing a sound created by the first vehicle

3.6204: receiving the audio signal via a second one of the multiple microphones

3.6205: determining the position of the first vehicle by determining a difference between an arrival time of the audio signal at the first microphone and an arrival time of the audio signal at the second microphone

Fig. 3.63

3.6300: The process of 3.6100, wherein the performing acoustic source localization includes:

3.6302: triangulating the position of the first vehicle based on a first and second angle, the first angle measured between a first one of the multiple microphones and the first vehicle, the second angle measured between a second one of the multiple microphones and the first vehicle

Fig. 3.64

3.6400: The process of 3.6000, wherein the determining the threat information based on the data representing the audio signal includes:

> 3.6402: performing a Doppler analysis of the data representing the audio signal to determine whether the first vehicle is approaching the user

Fig. 3.65

3.6500: The process of 3.6400, wherein the performing a Doppler analysis includes:

> 3.6502: determining whether frequency of the audio signal is increasing or decreasing

Fig. 3.66

3.6600: The process of 3.6000, wherein the determining the threat information based on the data representing the audio signal includes:

> 3.6602: performing a volume analysis of the data representing the audio signal to determine whether the first vehicle is approaching the user

Fig. 3.67

3.6700: The process of 3.6600, wherein the performing a volume analysis includes:

> 3.6702: determining whether volume of the audio signal is increasing or decreasing

Fig. 3.68

3.6800: The process of 3.100, wherein the determining threat information includes:

> 3.6802: determining threat information that is not related to the first vehicle

Fig. 3.69

3.6900: The process of 3.6800, wherein the determining threat information that is not related to the first vehicle includes:

> 3.6902: receiving and processing information about objects and/or conditions aside from the first vehicle

Fig. 3.70

3.7000: The process of 3.6900, wherein the receiving and processing information about objects and/or conditions aside from the first vehicle includes:

> 3.7002: receiving information about at least one of a stationary object, a pedestrian, and/or an animal

Fig. 3.71

3.7100: The process of 3.6800, wherein the determining threat information that is not related to the first vehicle includes:

> 3.7102: processing the information about the first vehicle to determine the threat information that is not related to the first vehicle

Fig. 3.72

3.7200: The process of 3.6800, wherein the determining threat information that is not related to the first vehicle includes:

> 3.7202: processing information other than the information about the first vehicle to determine the threat information that is not related to the first vehicle

Fig. 3.73

3.7300: The process of 3.6800, wherein the determining threat information that is not related to the first vehicle includes:

> 3.7302: determining that poor driving conditions exist

Fig. 3.74

3.7400: The process of 3.7300, wherein the determining that poor driving conditions exist includes:

> 3.7402: determining that adverse weather conditions exist

Fig. 3.75

3.7500: The process of 3.7300, wherein the determining that poor driving conditions exist includes:

> 3.7502: determining that a road construction project is present in proximity to the user

Fig. 3.76

3.7600: The process of 3.6800, wherein the determining threat information that is not related to the first vehicle includes:

> 3.7602: determining that a limited visibility condition exists

Fig. 3.77

3.7700: The process of 3.6800, wherein the determining threat information that is not related to the first vehicle includes:

> 3.7702: determining that there is slow traffic in proximity to the user

Fig. 3.78

3.7800: The process of 3.7700, wherein the determining that there is slow traffic in proximity to the user includes:

> 3.7802: receiving information from a traffic information system regarding traffic congestion on a road traveled by the user

Fig. 3.79

3.7900: The process of 3.7700, wherein the determining that there is slow traffic in proximity to the user includes:

> 3.7902: determining that one or more vehicles are traveling slower than an average or posted speed for a road traveled by the user

Fig. 3.80

3.8000: The process of 3.6800, wherein the determining threat information that is not related to the first vehicle includes:

> 3.8002: determining that poor surface conditions exist on a roadway traveled by the user

Fig. 3.81

3.8100: The process of 3.6800, wherein the determining threat information that is not related to the first vehicle includes:

> 3.8102: determining that there is a pedestrian in proximity to the user

Fig. 3.82

3.8200: The process of 3.6800, wherein the determining threat information that is not related to the first vehicle includes:

> 3.8202: determining that there is an accident in proximity to the user

Fig. 3.83

3.8300: The process of 3.6800, wherein the determining threat information that is not related to the first vehicle includes:

> 3.8302: determining that there is an animal in proximity to the user

*Fig. 3.84*

3.8400: The process of 3.100, wherein the determining threat information includes:

3.8402: determining the threat information based on gaze information associated with the user

*Fig. 3.85*

3.8500: The process of 3.8400, further comprising:

3.8502: receiving an indication of a direction in which the user is looking

3.8504: determining that the user is not looking towards the first vehicle

3.8506: in response to determining that the user is not looking towards the first vehicle, directing the user to look towards the first vehicle

*Fig. 3.86*

3.8600: The process of 3.100, further comprising:

3.8602: identifying multiple threats to the user

3.8604: identifying a first one of the multiple threats that is more significant than at least one other of the multiple threats

3.8607: instructing the user to avoid the first one of the multiple threats

Fig. 3.87

3.8700: The process of 3.8600, further comprising:

3.8702: modeling multiple potential accidents that each correspond to one of the multiple threats to determine a collision force associated with each accident

3.8704: selecting the first threat based at least in part on which of the multiple accidents has the highest collision force

Fig. 3.88

3.8800: The process of 3.8600, further comprising:

3.8802: determining a likelihood of an accident associated with each of the multiple threats

3.8804: selecting the first threat based at least in part on which of the multiple threats has the highest associated likelihood

Fig. 3.89

3.8900: The process of 3.8600, further comprising:

3.8902: determining a mass of an object associated with each of the multiple threats

3.8904: selecting the first threat based at least in part on which of the objects has the highest mass

Fig. 3.90

3.9000: The process of 3.8600, wherein the identifying a first one of the multiple threats that is more significant than at least one other of the multiple threats includes:

> 3.9002: selecting the most significant threat from the multiple threats

Fig. 3.91

3.9100: The process of 3.100, further comprising:

> 3.9102: determining that an evasive action with respect to the first vehicle poses a threat to some other object

> 3.9104: instructing the user to take some other evasive action that poses a lesser threat to the some other object

Fig. 3.92

3.9200: The process of 3.100, further comprising:

> 3.9202: identifying multiple threats that each have an associated likelihood and cost

> 3.9206: determining a course of action that minimizes an expected cost with respect to the multiple threats

Fig. 3.93

3.9300: The process of 3.9200, wherein the cost is based on one or more of a cost of damage to a vehicle, a cost of injury or death of a human, a cost of injury or death of an animal, a cost of damage to a structure, a cost of emotional distress, and/or cost to a business or person based on negative publicity associated with an accident

Fig. 3.94

3.9400: The process of 3.9200, wherein the identifying multiple threats includes:

> 3.9402:identifying multiple threats that are each related to different persons or things

Fig. 3.95

3.9500: The process of 3.9200, wherein the identifying multiple threats includes:

> 3.9502:identifying multiple threats that are each related to the user

Fig. 3.96

3.9600: The process of 3.9200, wherein the determining a course of action that minimizes an expected cost includes:

> 3.9602:minimizing expected costs to the user posed by the multiple threats

Fig. 3.97

3.9700: The process of 3.9200, wherein the determining a course of action that minimizes an expected cost includes:

> 3.9702: minimizing overall expected costs posed by the multiple threats, the overall expected costs being a sum of expected costs borne by the user and other persons/things

Fig. 3.98

3.9800: The process of 3.100, wherein the presenting the threat information includes:

> 3.9802: presenting the threat information via an audio output device of the wearable device

Fig. 3.99

3.9900: The process of 3.100, wherein the presenting the threat information includes:

> 3.9902: presenting the threat information via a visual display device of the wearable device

Fig. 3.100

3.10000: The process of 3.9900, wherein the presenting the threat information via a visual display device includes:

> 3.10002: displaying an indicator that instructs the user to look towards the first vehicle

Fig. 3.101

3.10100: The process of 3.9900, wherein the presenting the threat information via a visual display device includes:

> 3.10102: displaying an indicator that instructs the user to accelerate, decelerate, and/or turn

Fig. 3.102

3.10200: The process of 3.100, wherein the presenting the threat information includes:

> 3.10202: directing the user to accelerate

Fig. 3.103

3.10300: The process of 3.100, wherein the presenting the threat information includes:

> 3.10302: directing the user to decelerate

Fig. 3.104

3.10400: The process of 3.100, wherein the presenting the threat information includes:

> 3.10402: directing the user to turn

*Fig. 3.105*

3.10500: The process of 3.100, wherein the presenting the threat information includes:

3.10502:directing the user not to turn

*Fig. 3.106*

3.10600: The process of 3.100, further comprising:

3.10602:transmitting to the first vehicle a warning based on the threat information

*Fig. 3.107*

3.10700: The process of 3.100, further comprising:

3.10702:presenting the threat information via an output device of a vehicle of the user, the output device including a visual display and/or an audio speaker

*Fig. 3.108*

3.10800: The process of 3.100, wherein the wearable device is a helmet worn by the user

Fig. 3.109

3.10900: The process of 3.100, wherein the wearable device is goggles worn by the user

Fig. 3.110

3.11000: The process of 3.100, wherein the wearable device is eyeglasses worn by the user

Fig. 3.111

3.11100: The process of 3.100, wherein the presenting the threat information includes:

> 3.11102: presenting the threat information via goggles worn by the user

Fig. 3.112

3.11200: The process of 3.100, wherein the presenting the threat information includes:

> 3.11202: presenting the threat information via a helmet worn by the user

Fig. 3.113

3.11300: The process of 3.100, wherein the presenting the threat information includes:

> 3.11302: presenting the threat information via a hat worn by the user

Fig. 3.114

3.11400: The process of 3.100, wherein the presenting the threat information includes:

> 3.11402: presenting the threat information via eyeglasses worn by the user

Fig. 3.115

3.11500: The process of 3.100, wherein the presenting the threat information includes:

> 3.11502: presenting the threat information via audio speakers that are part of at least one of earphones, a headset, earbuds, and/or a hearing aid

Fig. 3.116

3.11600: The process of 3.100, further comprising:

> 3.11602: performing at the road-based device the determining threat information and/or the presenting the threat information

> 3.11604: transmitting the threat information from the road-based device to the wearable device of the user

Fig. 3.117

3.11700: The process of 3.100, further comprising:

3.11702: performing on a computing system that is remote from the road-based device the determining threat information and/or the presenting the threat information

3.11704: transmitting the threat information from the road-based device to the wearable device of the user

Fig. 3.118

3.11800: The process of 3.100, further comprising:

3.11802: receiving data representing threat information relevant to a second vehicle, the second vehicle not being used for travel by the user

3.11805: determining the threat information based on the data representing threat information relevant to the second vehicle

Fig. 3.119

3.11900: The process of 3.11800, wherein the receiving data representing threat information relevant to a second vehicle includes:

3.11902: receiving from the second vehicle an indication of stalled or slow traffic encountered by the second vehicle

Fig. 3.120

3.12000: The process of 3.11800, wherein the receiving data representing threat information relevant to a second vehicle includes:

> 3.12002: receiving from the second vehicle an indication of poor driving conditions experienced by the second vehicle

Fig. 3.121

3.12100: The process of 3.11800, wherein the receiving data representing threat information relevant to a second vehicle includes:

> 3.12102: receiving from the second vehicle an indication that the first vehicle is driving erratically

Fig. 3.122

3.12200: The process of 3.11800, wherein the receiving data representing threat information relevant to a second vehicle includes:

> 3.12202: receiving from the second vehicle an image of the first vehicle

Fig. 3.123

3.12300: The process of 3.100, further comprising:

> 3.12302: transmitting the threat information to a second vehicle

Fig. 3.124

3.12400: The process of 3.12300, wherein the transmitting the threat information to a second vehicle includes:

> 3.12402:transmitting the threat information to an intermediary server system for distribution to other vehicles in proximity to the user

Fig. 3.125

3.12500: The process of 3.100, further comprising:

> 3.12502:transmitting the threat information to a second road-based device situated along a projected course of travel of the first vehicle

Fig. 3.126

3.12600: The process of 3.12500, further comprising:

> 3.12602:causing the second road-based device to warn drivers that the first vehicle is driving erratically

Fig. 3.127

3.12700: The process of 3.12500, further comprising:

> 3.12702:causing the second road-based device to control a traffic control signal to inhibit a collision involving the first vehicle

Fig. 3.128

3.12800: The process of 3.100, further comprising:

3.12802:transmitting the threat information to a law enforcement entity

Fig. 3.129

3.12900: The process of 3.12800, further comprising:

3.12902:determining a license place identifier of the first vehicle based on the image data

3.12904:transmitting the license plate identifier to the law enforcement entity

Fig. 3.130

3.13000: The process of 3.12800, further comprising:

3.13002:determining a vehicle description of the first vehicle based on the image data

3.13004:transmitting the vehicle description to the law enforcement entity

Fig. 3.131
3.13100: The process of 3.12800, further comprising:
3.13102: determining a location associated with the first vehicle
3.13104: transmitting an indication of the location to the law enforcement entity
Fig. 3.132
3.13200: The process of 3.12800, further comprising:
3.13202: determining a direction of travel of the first vehicle
3.13204: transmitting an indication of the direction of travel to the law enforcement entity

DETERMINING THREATS BASED ON INFORMATION FROM ROAD-BASED DEVICES IN A TRANSPORTATION-RELATED CONTEXT

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements, the present application constitutes a continuation-in-part of U.S. patent application Ser. No. 13/309,248, entitled AUDIBLE ASSISTANCE, filed Dec. 1, 2011, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/324,232, entitled VISUAL PRESENTATION OF SPEAKER-RELATED INFORMATION, filed Dec. 13, 2011, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/340,143, entitled LANGUAGE TRANSLATION BASED ON SPEAKER-RELATED INFORMATION, filed Dec. 29, 2011, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/356,419, entitled ENHANCED VOICE CONFERENCING, filed Jan. 23, 2012, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/362,823, entitled VEHICULAR THREAT DETECTION BASED ON AUDIO SIGNALS, filed Jan. 31, 2012, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/397,289, entitled ENHANCED VOICE CONFERENCING WITH HISTORY, filed Feb. 15, 2012, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/407,570, entitled VEHICULAR THREAT DETECTION BASED ON IMAGE ANALYSIS, filed Feb. 28, 2012, which is currently co-pending, or is an application of which a currently co-pending application is entitled to the benefit of the filing date.

TECHNICAL FIELD

The present disclosure relates to methods, techniques, and systems for ability enhancement and, more particularly, to methods, techniques, and systems for ability enhancement in a transportation-related context by performing threat detection based at least in part on analyzing information received from road-based devices.

BACKGROUND

Human abilities such as hearing, vision, memory, foreign or native language comprehension, and the like may be limited for various reasons. For example, as people age, various abilities such as hearing, vision, or memory, may decline or otherwise become compromised. In some countries, as the population in general ages, such declines may become more common and widespread. In addition, young people are increasingly listening to music through headphones, which may also result in hearing loss at earlier ages.

In addition, limits on human abilities may be exposed by factors other than aging, injury, or overuse. As one example, the world population is faced with an ever increasing amount of information to review, remember, and/or integrate. Managing increasing amounts of information becomes increasingly difficult in the face of limited or declining abilities such as hearing, vision, and memory.

These problems may be further exacerbated and even result in serious health risks in a transportation-related context, as distracted and/or ability impaired drivers are more prone to be involved in accidents. For example, many drivers are increasingly distracted from the task of driving by an onslaught of information from cellular phones, smart phones, media players, navigation systems, and the like. In addition, an aging population in some regions may yield an increasing number or share of drivers who are vision and/or hearing impaired.

Current approaches to addressing limits on human abilities may suffer from various drawbacks. For example, there may be a social stigma connected with wearing hearing aids, corrective lenses, or similar devices. In addition, hearing aids typically perform only limited functions, such as amplifying or modulating sounds for a hearer. Furthermore, legal regimes that attempt to prohibit the use of telephones or media devices while driving may not be effective due to enforcement difficulties, declining law enforcement budgets, and the like. Nor do such regimes address a great number of other sources of distraction or impairment, such as other passengers, car radios, blinding sunlight, darkness, or the like.

BRIEF DESCRIPTION OF THE DRAWINGS

FIG. 1E is a second example ability enhancement scenario according to an example embodiment.

FIG. 2 is an example functional block diagram of an example ability enhancement facilitator system according to an example embodiment.

FIGS. 3.1-3.132 are example flow diagrams of ability enhancement processes performed by example embodiments.

DETAILED DESCRIPTION

Figure 1A:
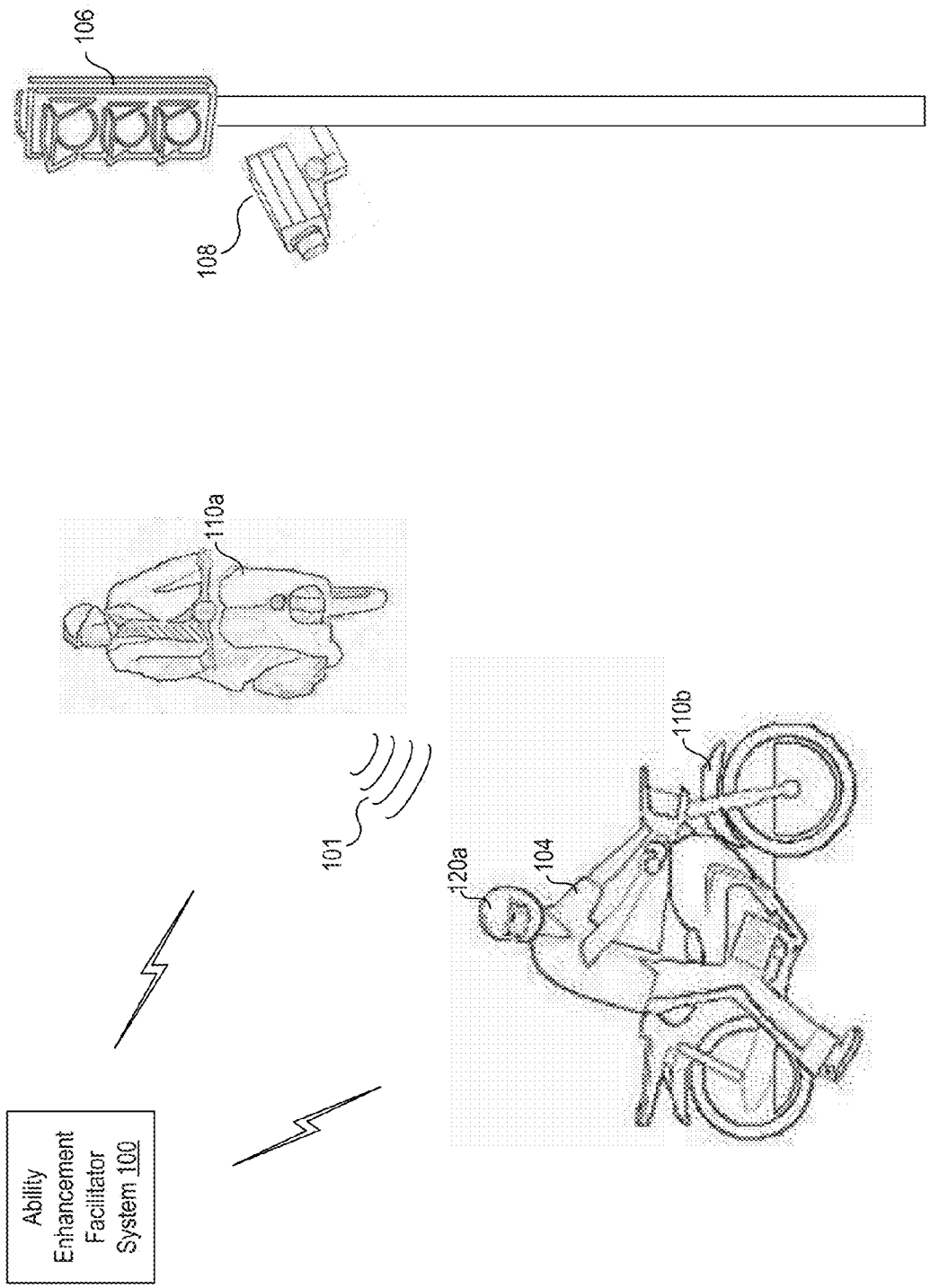
FIGS. 1A and 1B are various views of a first example ability enhancement scenario according to an example embodiment.

Embodiments described herein provide enhanced computer- and network-based methods and systems for ability enhancement and, more particularly, for enhancing a user's ability to operate or function in a transportation-related context (e.g., as a pedestrian or vehicle operator) by performing threat detection based at least in part on analyzing information received from road-based devices, such as a camera, microphone, or other sensor deployed at the side of a road, at an intersection, or other road-based location. The received information may include image data, audio data, or other data/signals that represent vehicles and other objects or conditions present in a roadway or other context. Example embodiments provide an Ability Enhancement Facilitator System ("AEFS") that performs at least some of the described techniques. Embodiments of the AEFS may augment, enhance, or improve the senses (e.g., hearing), faculties (e.g., memory, language comprehension), and/or other abilities (e.g., driving, riding a bike, walking/running) of a user.

In some embodiments, the AEFS is configured to identify threats (e.g., posed by vehicles to a user of a roadway, posed by a user to vehicles or other users of a roadway), and to provide information about such threats to the user so that he may take evasive action. Identifying threats may include analyzing information about a vehicle that is present in the roadway in order to determine whether the user and the vehicle may be on a collision course. The analyzed information may include or be represented by image data (e.g., pictures or video of a roadway and its surrounding environment), audio data (e.g., sounds reflected from or emitted by a vehicle), range information (e.g., provided by a sonar or infrared range sensor), conditions information (e.g., weather, temperature, time of day), or the like. The user may be a pedestrian (e.g., a walker, a jogger), an operator of a motorized (e.g., car, motorcycle, moped, scooter) or non-motorized vehicle (e.g., bicycle, pedicab, rickshaw), a vehicle passenger, or the like. In some embodiments, the vehicle may be operating autonomously. In some embodiments, the user wears a wearable device (e.g., a helmet, goggles, eyeglasses, hat) that is configured to at least present determined vehicular threat information to the user.

The AEFS may determine threats based on information received from various sources. Road-based sources may provide image, audio, or other types of data to the AEFS. The road-based sources may include sensors, devices, or systems that are deployed at, within, or about a roadway or intersection. For example, cameras, microphones, range sensors, velocity sensors, and the like may be affixed to utility or traffic signal support structures (e.g., poles, posts). As another example, induction coils embedded within a road can provide information to the AEFS about the presence and/or velocity of vehicles traveling over the road.

In some embodiments, the AEFS is configured to receive image data, at least some of which represents an image of a first vehicle. The image data may be obtained from various sources, including a camera of a wearable device of a user, a camera on a vehicle of the user, a road-side camera, a camera on some other vehicle, or the like. The image data may represent electromagnetic signals of various types or in various ranges, including visual signals (e.g., signals having a wavelength in the range of about 390-750 nm), infrared signals (e.g., signals having a wavelength in the range of about 750 nm-300 micrometers), or the like.

Then, the AEFS determines vehicular threat information based at least in part on the image data. In some embodiments, the AEFS may analyze the received image data in order to identify the first vehicle and/or to determine whether the first vehicle represents a threat to the user, such as because the first vehicle and the user may be on a collision course. The image data may be analyzed in various ways, including by identifying objects (e.g., to recognize that a vehicle or some other object is shown in the image data), determining motion-related information (e.g., position, velocity, acceleration, mass) about objects, or the like.

Next, the AEFS informs the user of the determined vehicular threat information via a wearable device of the user. Typically, the user's wearable device (e.g., a helmet) will include one or more output devices, such as audio speakers, visual display devices (e.g., warning lights, screens, heads-up displays), haptic devices, and the like. The AEFS may present the vehicular threat information via one or more of these output devices. For example, the AEFS may visually display or speak the words "Car on left." As another example, the AEFS may visually display a leftward pointing arrow on a heads-up screen displayed on a face screen of the user's helmet. Presenting the vehicular threat information may also or instead include presenting a recommended course of action (e.g., to slow down, to speed up, to turn) to mitigate the determined vehicular threat.

The AEFS may use other or additional sources or types of information. For example, in some embodiments, the AEFS is configured to receive data representing an audio signal emitted by a first vehicle. The audio signal is typically obtained in proximity to a user, who may be a pedestrian or traveling in a vehicle as an operator or a passenger. In some embodiments, the audio signal is obtained by one or more microphones coupled to a road-side structure, the user's vehicle and/or a wearable device of the user, such as a helmet, goggles, a hat, a media player, or the like. Then, the AEFS may determine vehicular threat information based at least in part on the data representing the audio signal. In some embodiments, the AEFS may analyze the received data in order to determine whether the first vehicle and the user are on a collision course. The audio data may be analyzed in various ways, including by performing audio analysis, frequency analysis (e.g., Doppler analysis), acoustic localization, or the like.

The AEFS may combine information of various types in order to determine threat information. For example, because image processing may be computationally expensive, rather than always processing all image data obtained from every possible source, the AEFS may use audio analysis to initially determine the approximate location of an oncoming vehicle, such as to the user's left, right, or rear. For example, having determined based on audio data that a vehicle may be approaching from the rear of the user, the AEFS may preferentially process image data from a rear-facing camera to further refine a threat analysis. As another example, the AEFS may incorporate information about the condition of a roadway (e.g., icy or wet) when determining whether a vehicle will be able to stop or maneuver in order to avoid an accident.

1. Ability Enhancement Facilitator System Overview

Figure 1B:
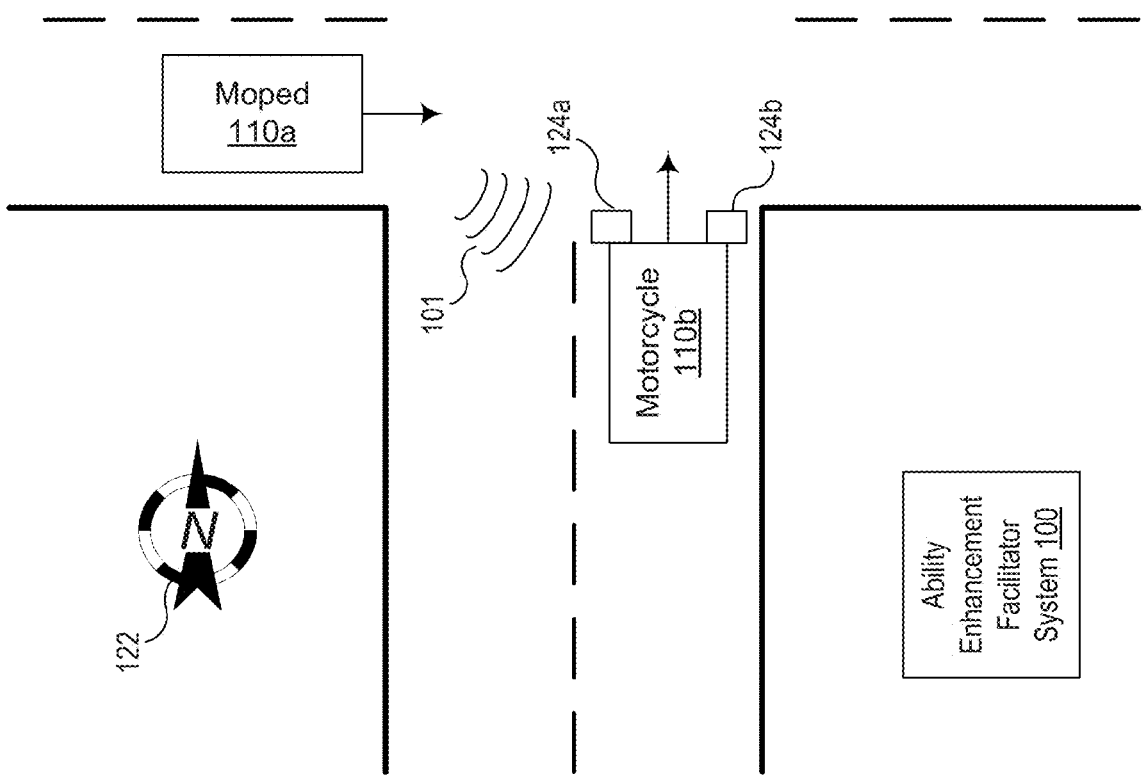

FIGS. 1A and 1B are various views of an example ability enhancement scenario according to an example embodiment. More particularly, FIGS. 1A and 1B respectively are perspective and top views of a traffic scenario which may result in a collision between two vehicles.

FIG. 1A is a perspective view of an example traffic scenario according to an example embodiment. The illustrated scenario includes two vehicles 110a (a moped) and 110b (a motorcycle). The motorcycle 110b is being ridden by a user 104 who is wearing a wearable device 120a (a helmet). An Ability Enhancement Facilitator System ("AEFS") 100 is enhancing the ability of the user 104 to operate his vehicle 110b via the wearable device 120a. The example scenario also includes a traffic signal 106 upon which is mounted a camera 108.

In this example, the moped 110a is driving towards the motorcycle 110b from a side street, at approximately a right angle with respect to the path of travel of the motorcycle 110b. The traffic signal 106 has just turned from red to green for the motorcycle 110b, and the user 104 is beginning to drive the motorcycle 110 into the intersection controlled by the traffic signal 106. The user 104 is assuming that the moped 110a will stop, because cross traffic will have a red light. However, in this example, the moped 110a may not stop in a timely manner, for one or more reasons, such as because the operator of the moped 110a has not seen the red light, because the moped 110a is moving at an excessive rate, because the operator of the moped 110a is impaired, because the surface conditions of the roadway are icy or slick, or the like. As will be discussed further below, the AEFS 100 will determine that the moped 110a and the motorcycle 110b are likely on a collision course, and inform the user 104 of this threat via the helmet 120a, so that the user may take evasive action to avoid a possible collision with the moped 110a.

The moped 110 emits or reflects a signal 101. In some embodiments, the signal 101 is an electromagnetic signal in the visible light spectrum that represents an image of the moped 110a. Other types of electromagnetic signals may be received and processed, including infrared radiation, radio waves, microwaves, or the like. Other types of signals are contemplated, including audio signals, such as an emitted engine noise, a reflected sonar signal, a vocalization (e.g., shout, scream), etc. The signal 101 may be received by a receiving detector/device/sensor, such as a camera or microphone (not shown) on the helmet 120a and/or the motorcycle 110b. In some embodiments, a computing and communication device within the helmet 120a receives and samples the signal 101 and transmits the samples or other representation to the AEFS 100. In other embodiments, other forms of data may be used to represent the signal 101, including frequency coefficients, compressed audio/video, or the like.

The AEFS 100 determines vehicular threat information by analyzing the received data that represents the signal 101. If the signal 101 is a visual signal, then the AEFS 100 may employ various image data processing techniques. For example, the AEFS 100 may perform object recognition to determine that received image data includes an image of a vehicle, such as the moped 110a. The AEFS 100 may also or instead process received image data to determine motion-related information with respect to the moped 110, including position, velocity, acceleration, or the like. The AEFS 100 may further identify the presence of other objects, including pedestrians, animals, structures, or the like, that may pose a threat to the user 104 or that may be themselves threatened (e.g., by actions of the user 104 and/or the moped 110a). Image processing also may be employed to determine other information, including road conditions (e.g., wet or icy roads), visibility conditions (e.g., glare or darkness), and the like.

If the signal 101 is an audio signal, then the AEFS 100 may use one or more audio analysis techniques to determine the vehicular threat information. In one embodiment, the AEFS 100 performs a Doppler analysis (e.g., by determining whether the frequency of the audio signal is increasing or decreasing) to determine that the object that is emitting the audio signal is approaching (and possibly at what rate) the user 104. In some embodiments, the AEFS 100 may determine the type of vehicle (e.g., a heavy truck, a passenger vehicle, a motorcycle, a moped) by analyzing the received data to identify an audio signature that is correlated with a particular engine type or size. For example, a lower frequency engine sound may be correlated with a larger vehicle size, and a higher frequency engine sound may be correlated with a smaller vehicle size.

In one embodiment, where the signal 101 is an audio signal, the AEFS 100 performs acoustic source localization to determine information about the trajectory of the moped 110a, including one or more of position, direction of travel, speed, acceleration, or the like. Acoustic source localization may include receiving data representing the audio signal 101 as measured by two or more microphones. For example, the helmet 120a may include four microphones (e.g., front, right, rear, and left) that each receive the audio signal 101. These microphones may be directional, such that they can be used to provide directional information (e.g., an angle between the helmet and the audio source). Such directional information may then be used by the AEFS 100 to triangulate the position of the moped 110a. As another example, the AEFS 100 may measure differences between the arrival time of the audio signal 101 at multiple distinct microphones on the helmet 120a or other location. The difference in arrival time, together with information about the distance between the microphones, can be used by the AEFS 100 to determine distances between each of the microphones and the audio source, such as the moped 110a. Distances between the microphones and the audio source can then be used to determine one or more locations at which the audio source may be located.

Determining vehicular threat information may also or instead include obtaining information such as the position, trajectory, and speed of the user 104, such as by receiving data representing such information from sensors, devices, and/or systems on board the motorcycle 110b and/or the helmet 120a. Such sources of information may include a speedometer, a geo-location system (e.g., GPS system), an accelerometer, or the like. Once the AEFS 100 has determined and/or obtained information such as the position, trajectory, and speed of the moped 110a and the user 104, the AEFS 100 may determine whether the moped 110a and the user 104 are likely to collide with one another. For example, the AEFS 100 may model the expected trajectories of the moped 110a and user 104 to determine whether they intersect at or about the same point in time.

The AEFS 100 may then present the determined vehicular threat information (e.g., that the moped 110a represents a hazard) to the user 104 via the helmet 120a. Presenting the vehicular threat information may include transmitting the information to the helmet 120a, where it is received and presented to the user. In one embodiment, the helmet 120a includes audio speakers that may be used to output an audio signal (e.g., an alarm or voice message) warning the user 104. In other embodiments, the helmet 120a includes a visual display, such as a heads-up display presented upon a face screen of the helmet 120a, which can be used to present a text message (e.g., "Look left") or an icon (e.g., a red arrow pointing left).

As noted, the AEFS 100 may also use information received from road-based sensors and/or devices. For example, the AEFS 100 may use information received from a camera 108 that is mounted on the traffic signal 106 that controls the illustrated intersection. The AEFS 100 may receive image data that represents the moped 110a and/or the motorcycle 110b. The AEFS 100 may perform image recognition to determine the type and/or position of a vehicle that is approaching the intersection. The AEFS 100 may also or instead analyze multiple images (e.g., from a video signal) to determine the velocity of a vehicle. Other types of sensors or devices installed in or about a roadway may also or instead by used, including range sensors, speed sensors (e.g., radar guns), induction coils (e.g., loops mounted in the roadbed), temperature sensors, weather gauges, or the like.

FIG. 1B is a top view of the traffic scenario described with respect to FIG. 1A, above. FIG. 1B includes a legend 122 that indicates the compass directions. In this example, moped 110a is traveling eastbound and is about to enter the intersection. Motorcycle 110b is traveling northbound and is also about to enter the intersection. Also shown are the signal 101, the traffic signal 106, and the camera 108.

As noted above, the AEFS 100 may utilize data that represents a signal as detected by one or more detectors/sensors, such as microphones or cameras. In the example of FIG. 1B, the motorcycle 110b includes two sensors 124a and 124b, respectively mounted at the front left and front right of the motorcycle 110b.

In an image context, the AEFS 100 may perform image processing on image data obtained from one or more of the camera sensors 124a and 124b. As discussed, the image data may be processed to determine the presence of the moped, its type, its motion-related information (e.g., velocity), and the like. In some embodiments, image data may be processed without making any definite identification of a vehicle. For example, the AEFS 100 may process image data from sensors 124a and 124b to identify the presence of motion (without necessarily identifying any objects). Based on such an analysis, the AEFS 100 may determine that there is something approaching from the left of the motorcycle 110b, but that the right of the motorcycle 110b is relatively clear.

Differences between data obtained from multiple sensors may be exploited in various ways. In an image context, an image signal may be perceived or captured differently by the two (camera) sensors 124a and 124b. The AEFS 100 may exploit or otherwise analyze such differences to determine the location and/or motion of the moped 110a. For example, knowing the relative position and optical qualities of the two cameras, it is possible to analyze images captured by those cameras to triangulate a position of an object (e.g., the moped 110a) or a distance between the motorcycle 110b and the object.

In an audio context, an audio signal may be perceived differently by the two sensors 124a and 124b. For example, if the strength of the signal 101 is stronger as measured at microphone 124a than at microphone 124b, the AEFS 100 may infer that the signal 101 is originating from the driver's left of the motorcycle 110b, and thus that a vehicle is approaching from that direction. As another example, as the strength of an audio signal is known to decay with distance, and assuming an initial level (e.g., based on an average signal level of a vehicle engine) the AEFS 100 may determine a distance (or distance interval) between one or more of the microphones and the signal source.

The AEFS 100 may model vehicles and other objects, such as by representing their motion-related information, including position, speed, acceleration, mass and other properties. Such a model may then be used to determine whether objects are likely to collide. Note that the model may be probabilistic. For example the AEFS 100 may represent an object's position in space as a region that includes multiple positions that each have a corresponding likelihood that that the object is at that position. As another example, the AEFS 100 may represent the velocity of an object as a range of likely values, a probability distribution, or the like. Various frames of reference may be employed, including a user-centric frame, an absolute frame, or the like.

Figure 1C:
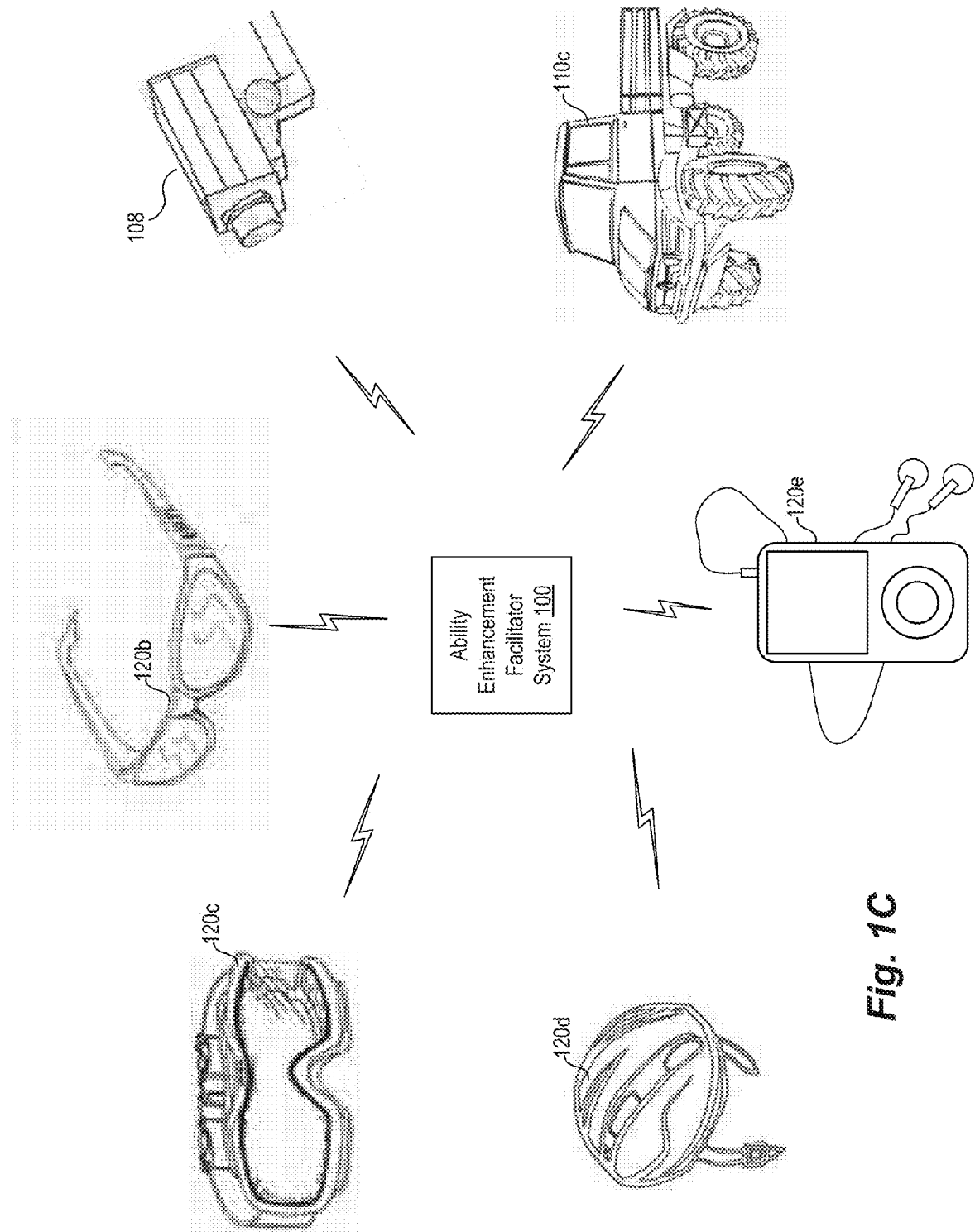
FIG. 1C is an example block diagram illustrating various devices in communication with an ability enhancement facilitator system according to example embodiments.

FIG. 1C is an example block diagram illustrating various devices in communication with an ability enhancement facilitator system according to example embodiments. In particular, FIG. 1C illustrates an AEFS 100 in communication with a variety of wearable devices 120b-120e, a camera 108, and a vehicle 110c.

The AEFS 100 may interact with various types of wearable devices 120, including a motorcycle helmet 120a (FIG. 1A), eyeglasses 120b, goggles 120c, a bicycle helmet 120d, a personal media device 120e, or the like. Wearable devices 120 may include any device modified to have sufficient computing and communication capability to interact with the AEFS 100, such as by presenting vehicular threat information received from the AEFS 100, providing data (e.g., audio data) for analysis to the AEFS 100, or the like.

In some embodiments, a wearable device may perform some or all of the functions of the AEFS 100, even though the AEFS 100 is depicted as separate in these examples. Some devices may have minimal processing power and thus perform only some of the functions. For example, the eyeglasses 120b may receive vehicular threat information from a remote AEFS 100, and display it on a heads-up display displayed on the inside of the lenses of the eyeglasses 120b. Other wearable devices may have sufficient processing power to perform more of the functions of the AEFS 100. For example, the personal media device 120e may have considerable processing power and as such be configured to perform acoustic source localization, collision detection analysis, or other more computational expensive functions.

Note that the wearable devices 120 may act in concert with one another or with other entities to perform functions of the AEFS 100. For example, the eyeglasses 120b may include a display mechanism that receives and displays vehicular threat information determined by the personal media device 120e. As another example, the goggles 120c may include a display mechanism that receives and displays vehicular threat information determined by a computing device in the helmet 120a or 120d. In a further example, one of the wearable devices 120 may receive and process audio data received by microphones mounted on the vehicle 110c.

The AEFS 100 may also or instead interact with vehicles 110 and/or computing devices installed thereon. As noted, a vehicle 110 may have one or more sensors or devices that may operate as (direct or indirect) sources of information for the AEFS 100. The vehicle 110c, for example, may include a speedometer, an accelerometer, one or more microphones, one or more range sensors, or the like. Data obtained by, at, or from such devices of vehicle 110c may be forwarded to the AEFS 100, possibly by a wearable device 120 of an operator of the vehicle 110c.

In some embodiments, the vehicle 110c may itself have or use an AEFS, and be configured to transmit warnings or other vehicular threat information to others. For example, an AEFS of the vehicle 110c may have determined that the moped 110a was driving with excessive speed just prior to the scenario depicted in FIG. 1B. The AEFS of the vehicle 110c may then share this information, such as with the AEFS 100. The AEFS 100 may accordingly receive and exploit this information when determining that the moped 110a poses a threat to the motorcycle 110b.

The AEFS 100 may also or instead interact with sensors and other devices that are installed on, in, or about roads or in other transportation related contexts, such as parking garages, racetracks, or the like. In this example, the AEFS 100 interacts with the camera 108 to obtain images of vehicles, pedestrians, or other objects present in a roadway. Other types of sensors or devices may include range sensors, infrared sensors, induction coils, radar guns, temperature gauges, precipitation gauges, or the like.

The AEFS 100 may further interact with information systems that are not shown in FIG. 1C. For example, the AEFS 100 may receive information from traffic information systems that are used to report traffic accidents, road conditions, construction delays, and other information about road conditions. The AEFS 100 may receive information from weather systems that provide information about current weather conditions. The AEFS 100 may receive and exploit statistical information, such as that drivers in particular regions are more aggressive, that red light violations are more frequent at particular intersections, that drivers are more likely to be intoxicated at particular times of day or year, or the like.

In some embodiments, the AEFS 100 may transmit information to law enforcement agencies and/or related computing systems. For example, if the AEFS 100 determines that a vehicle is driving erratically, it may transmit that fact along with information about the vehicle (e.g., make, model, color, license plate number, location) to a police computing system.

Note that in some embodiments, at least some of the described techniques may be performed without the utilization of any wearable devices 120. For example, a vehicle 110 may itself include the necessary computation, input, and output devices to perform functions of the AEFS 100. For example, the AEFS 100 may present vehicular threat information on output devices of a vehicle 110, such as a radio speaker, dashboard warning light, heads-up display, or the like. As another example, a computing device on a vehicle 110 may itself determine the vehicular threat information.

Figure 1D:
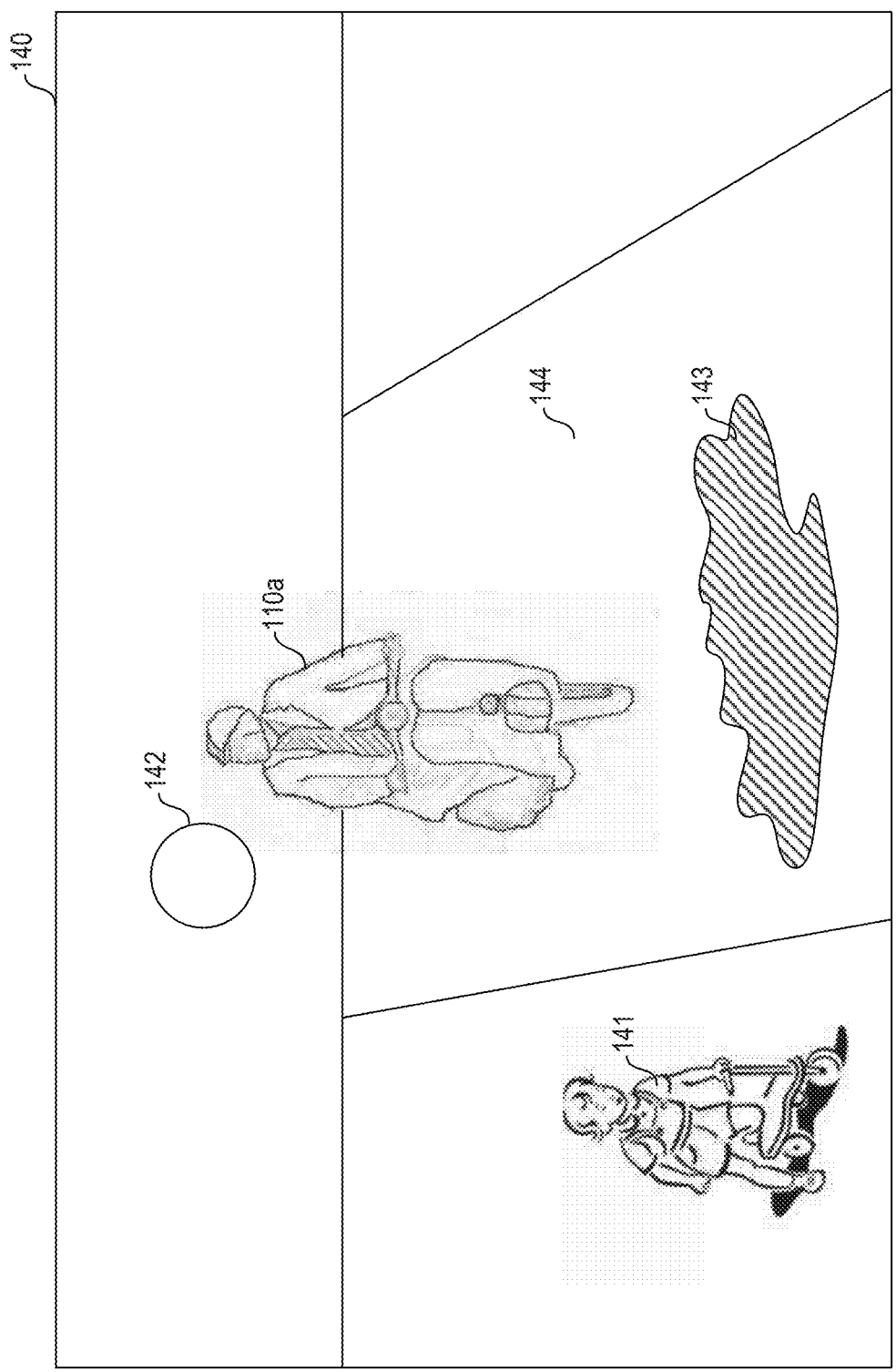
FIG. 1D is an example diagram illustrating an example image processed according to an example embodiment.

FIG. 1D is an example diagram illustrating an example image processed according to an example embodiment. In particular, FIG. 1D depicts an image 140 of the moped 110a. This image may be obtained from a camera (e.g., sensor 124a) on the left side of the motorcycle 110b in the scenario of FIG. 1B. The image may also or instead be obtained from camera 108 mounted on the traffic signal 106, as shown in FIG. 1B. Also visible in the image 140 are a child 141 on a scooter, the sun 142, and a puddle 143. The sun 142 is setting in the west, and is thus low in the sky, appearing nearly behind the moped 110a. In such conditions, visibility for the user 104 (not shown here) would be quite difficult.

In some embodiments, the AEFS 100 processes the image 140 to perform object identification. Upon processing the image 140, the AEFS 100 may identify the moped 110a, the child 141, the sun 142, the puddle 143, and/or the roadway 144. A sequence of images, taken at different times (e.g., one tenth of a second apart) may be used to determine that the moped 110a is moving, how fast the moped 110a is moving, acceleration/deceleration of the moped 110a, or the like.

Motion of other objects, such as the child 141 may also be tracked. Based on such motion-related information, the AEFS 100 may model the physics of the identified objects to determine whether a collision is likely.

Determining vehicular threat information may also or instead be based on factors related or relevant to objects other than the moped 110a or the user 104. For example, the AEFS 100 may determine that the puddle 143 will likely make it more difficult for the moped 110a to stop. Thus, even if the moped 110a is moving at a reasonable speed, he still may be unable to stop prior to entering the intersection due to the presence of the puddle 143. As another example, the AEFS 100 may determine that evasive action by the user 104 and/or the moped 110a may cause injury to the child 141. As a further example, the AEFS 100 may determine that it may be difficult for the user 104 to see the moped 110a and/or the child 141 due to the position of the sun 142. Such information may be incorporated into any models, predictions, or determinations made or maintained by the AEFS 100.

FIG. 1E is a second example ability enhancement scenario according to an example embodiment. In particular, FIG. 1E is a top view of a traffic scenario that is similar to that shown in FIG. 1B. However, in FIG. 1E, rather than approaching each other from right angles (as in FIG. 1B), the moped 110a and the motorcycle 110b are heading towards each other, each in their respective lanes. FIG. 1E includes a legend 122 that indicates the compass directions. The moped 110a is east bound, and the motorcycle 110b is west bound. The driver of the motorcycle 110b wishes to turn left, across the path of the oncoming moped 110a.

The scenario of FIG. 1E may commonly result in an accident. Such is the case particularly during signal changes, because it is difficult for the driver of the motorcycle 110b to determine whether the moped 110a is slowing down (e.g., to stop for a yellow light) or speeding up (e.g., to beat the yellow light). In addition, visibility conditions may make it more difficult for the driver of the motorcycle 110b to determine the speed of the moped 110a. For example, if the sun is setting behind the moped 110a, then the driver of the motorcycle 110b may not even have a clear view of the moped 110a. Also, surface conditions may make it difficult for the moped 110a to stop if the driver of the motorcycle 110b does decide to make the left turn ahead of the moped 110a. For example, a wet or oily road surface may increase the braking distance of the moped 110a.

In this example, the AEFS 100 determines that the driver of the motorcycle 110b intends to make a left turn. This determination may be based on the fact that the motorcycle 110b is slowing down or has activated its turn signals. In some embodiments, when the driver activates a turn signal, an indication of the activation is transmitted to the AEFS 100. The AEFS 100 then receives information (e.g., image data) about the moped 110a from the camera 108 and possibly one or more other sources (e.g., a camera, microphone, or other device on the motorcycle 110b; a device on the moped 110a; a road-embedded device). By analyzing the image data, the AEFS 100 can estimate the motion-related information (e.g., position, speed, acceleration) about the moped 110a. Based on this motion-related information, the AEFS 100 can determine threat information such as whether the moped 110a is slowing to stop or instead attempting to speed through the intersection. The AEFS 100 can then inform the user of the determined threat information, as discussed further with respect to FIG. 1F, below.

Figure 1F:
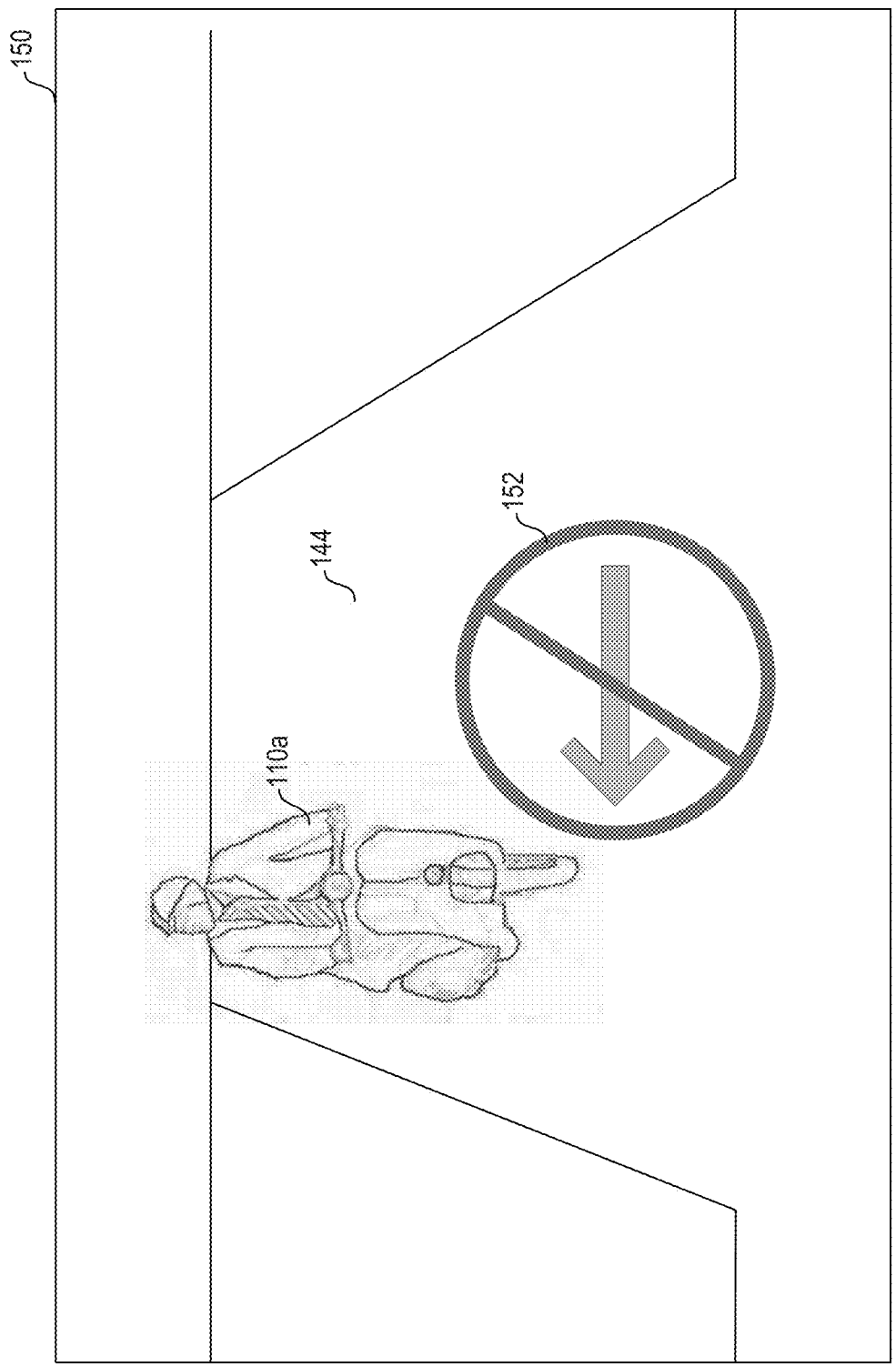
FIG. 1F is an example diagram illustrating an example user interface display according to an example embodiment.

FIG. 1F is an example diagram illustrating an example user interface display according to an example embodiment. FIG.

1F depicts a display 150 that includes a message 152. Also visible in the display 150 is the moped 110a and its driver, as well as the roadway 144.

The display 150 may be used by embodiments of the AEFS to present threat information to users. For example, as discussed with respect to the scenario of FIG. 1E, the AEFS may determine that the moped 110a is advancing too quickly for the motorcycle 110b to safely make a left turn. In response to this determination, the AEFS may present the message 152 on the display 150 in order to instruct the motorcycle 110b driver to avoid making a left turn in advance of the oncoming moped 110a. In this example, the message 152 is iconic and includes a left turn arrow surrounded by a circle with a line through it. Other types of messages and/or output modalities are contemplated, including textual (e.g., "No Turn"), audible (e.g., a chime, buzzer, alarm, or voice message), tactile (e.g., vibration of a steering wheel), or the like. The message 152 may be styled or decorated in various ways, including by use of colors, intermittence (e.g., flashing), size, or the like.

The display 150 may be provided in various ways. In one embodiment, the display 150 is presented by a heads-up display provided by a vehicle, such as the motorcycle 110b, a car, truck, or the like, where the display is presented on the wind screen or other surface. In another embodiment, the display 150 may be presented by a heads-up display provided by a wearable device, such as goggles or a helmet, where the display 150 is presented on a face or eye shield. In another embodiment, the display 150 may be presented by an LCD or similar screen in a dashboard or other portion of a vehicle.

FIG. 2 is an example functional block diagram of an example ability enhancement facilitator system according to an example embodiment. In the illustrated embodiment of FIG. 2, the AEFS 100 includes a threat analysis engine 210, agent logic 220, a presentation engine 230, and a data store 240. The AEFS 100 is shown interacting with a wearable device 120 and information sources 130. The information sources 130 include any sensors, devices, systems, or the like that provide information to the AEFS 100, including but not limited to vehicle-based devices (e.g., speedometers), road-based devices (e.g., road-side cameras), and information systems (e.g., traffic systems).

The threat analysis engine 210 includes an audio processor 212, an image processor 214, other sensor data processors 216, and an object tracker 218. In the illustrated example, the audio processor 212 processes audio data received from the wearable device 120. As noted, such data may be received from other sources as well or instead, including directly from a vehicle-mounted microphone, or the like. The audio processor 212 may perform various types of signal processing, including audio level analysis, frequency analysis, acoustic source localization, or the like. Based on such signal processing, the audio processor 212 may determine strength, direction of audio signals, audio source distance, audio source type, or the like. Outputs of the audio processor 212 (e.g., that an object is approaching from a particular angle) may be provided to the object tracker 218 and/or stored in the data store 240.

The image processor 214 receives and processes image data that may be received from sources such as the wearable device 120 and/or information sources 130. For example, the image processor 214 may receive image data from a camera of the wearable device 120, and perform object recognition to determine the type and/or position of a vehicle that is approaching the user 104. As another example, the image processor 214 may receive a video signal (e.g., a sequence or stream of images) and process them to determine the type, position, and/or velocity of a vehicle that is approaching the user 104. Multiple images may be processed to determine the presence or absence of motion, even if no object recognition is performed. Outputs of the image processor 214 (e.g., position and velocity information, vehicle type information) may be provided to the object tracker 218 and/or stored in the data store 240.

The other sensor data processor 216 receives and processes data received from other sensors or sources. For example, the other sensor data processor 216 may receive and/or determine information about the position and/or movements of the user and/or one or more vehicles, such as based on GPS systems, speedometers, accelerometers, or other devices. As another example, the other sensor data processor 216 may receive and process conditions information (e.g., temperature, precipitation) from the information sources 130 and determine that road conditions are currently icy. Outputs of the other sensor data processor 216 (e.g., that the user is moving at 5 miles per hour) may be provided to the object tracker 218 and/or stored in the data store 240.

The object tracker 218 manages a geospatial object model that includes information about objects known to the AEFS 100. The object tracker 218 receives and merges information about object types, positions, velocity, acceleration, direction of travel, and the like, from one or more of the processors 212, 214, 216, and/or other sources. Based on such information, the object tracker 218 may identify the presence of objects as well as their likely positions, paths, and the like. The object tracker 218 may continually update this model as new information becomes available and/or as time passes (e.g., by plotting a likely current position of an object based on its last measured position and trajectory). The object tracker 218 may also maintain confidence levels corresponding to elements of the geo-spatial model, such as a likelihood that a vehicle is at a particular position or moving at a particular velocity, that a particular object is a vehicle and not a pedestrian, or the like.

The agent logic 220 implements the core intelligence of the AEFS 100. The agent logic 220 may include a reasoning engine (e.g., a rules engine, decision trees, Bayesian inference engine) that combines information from multiple sources to determine vehicular threat information. For example, the agent logic 220 may combine information from the object tracker 218, such as that there is a determined likelihood of a collision at an intersection, with information from one of the information sources 130, such as that the intersection is the scene of common red-light violations, and decide that the likelihood of a collision is high enough to transmit a warning to the user 104. As another example, the agent logic 220 may, in the face of multiple distinct threats to the user, determine which threat is the most significant and cause the user to avoid the more significant threat, such as by not directing the user 104 to slam on the brakes when a bicycle is approaching from the side but a truck is approaching from the rear, because being rear-ended by the truck would have more serious consequences than being hit from the side by the bicycle.

The presentation engine 230 includes a visible output processor 232 and an audible output processor 234. The visible output processor 232 may prepare, format, and/or cause information to be displayed on a display device, such as a display of the wearable device 120 or some other display (e.g., a heads-up display of a vehicle 110 being driven by the user 104). The agent logic 220 may use or invoke the visible output processor 232 to prepare and display information, such as by formatting or otherwise modifying vehicular threat information to fit on a particular type or size of display. The audible output processor 234 may include or use other components for generating audible output, such as tones, sounds, voices, or the like. In some embodiments, the agent logic 220 may use or invoke the audible output processor 234 in order to convert a textual message (e.g., a warning message, a threat identification) into audio output suitable for presentation via the wearable device 120, for example by employing a text-to-speech processor.

Note that one or more of the illustrated components/modules may not be present in some embodiments. For example, in embodiments that do not perform image or video processing, the AEFS 100 may not include an image processor 214. As another example, in embodiments that do not perform audio output, the AEFS 100 may not include an audible output processor 234.

Note also that the AEFS 100 may act in service of multiple users 104. In some embodiments, the AEFS 100 may determine vehicular threat information concurrently for multiple distinct users. Such embodiments may further facilitate the sharing of vehicular threat information. For example, vehicular threat information determined as between two vehicles may be relevant and thus shared with a third vehicle that is in proximity to the other two vehicles.

2. Example Processes

FIGS. 3.1-3.132 are example flow diagrams of ability enhancement processes performed by example embodiments.

FIG. 3.1 is an example flow diagram of example logic for enhancing ability in a transportation-related context. The illustrated logic in this and the following flow diagrams may be performed by, for example, one or more components of the AEFS 100 described with respect to FIG. 2, above. One or more functions of the AEFS 100 may be performed at various fixed locations, such as at a road-side computing system, a cloud- or server-based computing system, or the like. In some embodiments, one or more functions may be performed in mobile locations, including at a wearable device, a vehicle of a user, some other vehicle, or the like. More particularly, FIG. 3.1 illustrates a process 3.100 that includes operations performed by or at the following block(s).

At block 3.103, the process performs at a road-based device, receiving information about a first vehicle that is proximate to the road-based device. The process may receive various types of information about the first vehicle, including image data, audio data, motion-related information, and the like, as discussed further below. This information is received at a road-based device, which is typically a fixed device situated on, in, or about a roadway traveled by the first vehicle. Example devices include cameras, microphones, induction loops, radar guns, range sensors (e.g., sonar, radar, LIDAR, IR-based), and the like. The device may be fixed (permanently or removably) to a structure, such as a utility pole, a traffic control signal, a building, or the like. In other embodiments, the road-based device may instead or also be a mobile device, such as may be situated in the first vehicle, on the user's person, on a trailer parked by the side of a road, or the like.

At block 3.106, the process performs determining threat information based at least in part on the information about the first vehicle. Threat information may include information related to threats posed by the first vehicle (e.g., to the user or to some other entity), by a vehicle occupied by the user (e.g., to the first vehicle or to some other entity), or the like. Note that threats may be posed by vehicles to non-vehicles, including pedestrians, animals, structures, or the like. Threats may also include those threats posed by non-vehicles (e.g., structures, pedestrians) to vehicles. Threat information may be determined in various ways. For example, where the received information is image data, the process may analyze the image data to identify objects, such as vehicles, pedestrians, fixed objects, and the like. In some embodiments, determining the threat information may also or instead include determining motion-related information about identified objects, including position, velocity, direction of travel, accelerations, or the like. In some embodiments, the received information is motion-related information that is transmitted by vehicles traveling about the roadway. Determining the threat information may also or instead include predicting whether the path of the user and one or more identified objects may intersect. These and other variations are discussed further below.

At block 3.109, the process performs presenting the threat information via a wearable device of a user. The determined threat information may be presented in various ways, such as by presenting an audible or visible warning or other indication that the first vehicle is approaching the user. Different types of wearable devices are contemplated, including helmets, eyeglasses, goggles, hats, and the like. In other embodiments, the threat information may also or instead be presented in other ways, such as via an output device on a vehicle of the user, in-situ output devices (e.g., traffic signs, road-side speakers), or the like. In some embodiments, the process may cause traffic control signals or devices to automatically change state, such as by changing a traffic light from green to red to inhibit cars from entering an intersection.

FIG. 3.2 is an example flow diagram of example logic illustrating an example embodiment of process 3.100 of FIG. 3.1. More particularly, FIG. 3.2 illustrates a process 3.200 that includes the process 3.100, wherein the determining threat information includes operations performed by or at one or more of the following block(s).

At block 3.202, the process performs determining a threat posed by the first vehicle to the user. As noted, the threat information may indicate a threat posed by the first vehicle to the user, such as that the first vehicle may collide with the user unless evasive action is taken.

FIG. 3.3 is an example flow diagram of example logic illustrating an example embodiment of process 3.100 of FIG. 3.1. More particularly, FIG. 3.3 illustrates a process 3.300 that includes the process 3.100, wherein the determining threat information includes operations performed by or at one or more of the following block(s).

At block 3.302, the process performs determining a threat posed by the first vehicle to some other entity besides the user. As noted, the threat information may indicate a threat posed by the first vehicle to some other person or thing, such as that the first vehicle may collide with the other entity. The other entity may be a vehicle occupied by the user, a vehicle not occupied by the user, a pedestrian, a structure, or any other object that may come into proximity with the first vehicle.

FIG. 3.4 is an example flow diagram of example logic illustrating an example embodiment of process 3.100 of FIG. 3.1. More particularly, FIG. 3.4 illustrates a process 3.400 that includes the process 3.100, wherein the determining threat information includes operations performed by or at one or more of the following block(s).

At block 3.402, the process performs determining a threat posed by a vehicle occupied by the user to the first vehicle. The threat information may indicate a threat posed by the user's vehicle (e.g., as a driver or passenger) to the first vehicle, such as because a collision may occur between the two vehicles. The vehicle occupied by the user may be the first vehicle or some other vehicle.

FIG. 3.5 is an example flow diagram of example logic illustrating an example embodiment of process 3.100 of FIG. 3.1. More particularly, FIG. 3.5 illustrates a process 3.500 that includes the process 3.100, wherein the determining threat information includes operations performed by or at one or more of the following block(s).

At block 3.502, the process performs determining a threat posed by a vehicle occupied by the user to some other entity besides the first vehicle. The threat information may indicate a threat posed by the user's vehicle to some other person or thing, such as due to a potential collision. The other entity may be some other vehicle, a pedestrian, a structure, or any other object that may come into proximity with the user's vehicle.

FIG. 3.6 is an example flow diagram of example logic illustrating an example embodiment of process 3.100 of FIG. 3.1. More particularly, FIG. 3.6 illustrates a process 3.600 that includes the process 3.100, wherein the determining threat information includes operations performed by or at one or more of the following block(s).

At block 3.602, the process performs determining a likelihood that the first vehicle will collide with some other object. In some embodiments, the process may determine a probability or other measure of the likelihood that the first vehicle will collide with some other object, such as another vehicle, a structure, a person, or the like. Such a determination may be made by reference to an object model that models the motions of objects in the roadway based on observations or other information gathered about such objects.

FIG. 3.7 is an example flow diagram of example logic illustrating an example embodiment of process 3.600 of FIG. 3.6. More particularly, FIG. 3.7 illustrates a process 3.700 that includes the process 3.600, wherein the determining a likelihood that the first vehicle will collide with some other object includes operations performed by or at one or more of the following block(s).

At block 3.702, the process performs determining a likelihood that the first vehicle will collide with the user. For example, the process may determine a probability that the first vehicle will collide with the user or a vehicle occupied by the user.

FIG. 3.8 is an example flow diagram of example logic illustrating an example embodiment of process 3.600 of FIG. 3.6. More particularly, FIG. 3.8 illustrates a process 3.800 that includes the process 3.600, wherein the determining a likelihood that the first vehicle will collide with some other object includes operations performed by or at one or more of the following block(s).

At block 3.802, the process performs determining that the likelihood that the first vehicle will collide with some other object is greater than a threshold. In some embodiments, the process compares the determined collision likelihood with a threshold. When the likelihood exceeds the threshold, particular actions may be taken, such as presenting a warning to the user or directing the user to take evasive action.

FIG. 3.9 is an example flow diagram of example logic illustrating an example embodiment of process 3.100 of FIG. 3.1. More particularly, FIG. 3.9 illustrates a process 3.900 that includes the process 3.100, wherein the determining threat information includes operations performed by or at one or more of the following block(s).

At block 3.902, the process performs determining that the first vehicle is driving erratically. The first vehicle may be driving erratically for a number of reasons, including due to a medical condition (e.g., a heart attack, bad eyesight, shortness of breath), drug/alcohol impairment, distractions (e.g., text messaging, crying children, loud music), or the like. Driving erratically may include driving too fast, too slow, not staying within traffic lanes, or the like.

FIG. 3.10 is an example flow diagram of example logic illustrating an example embodiment of process 3.100 of FIG. 3.1. More particularly, FIG. 3.10 illustrates a process 3.1000 that includes the process 3.100, wherein the determining threat information includes operations performed by or at one or more of the following block(s).

At block 3.1002, the process performs determining that the first vehicle is driving with excessive speed. Excessive speed may be determined relatively, such as with respect to the average traffic speed on a road segment, posted speed limit, or the like. Similar techniques may be employed to determine if a vehicle is traveling too slowly.

FIG. 3.11 is an example flow diagram of example logic illustrating an example embodiment of process 3.1000 of FIG. 3.10. More particularly, FIG. 3.11 illustrates a process 3.1100 that includes the process 3.1000, wherein the determining that the first vehicle is driving with excessive speed includes operations performed by or at one or more of the following block(s).

At block 3.1102, the process performs determining that the first vehicle is traveling more than a threshold percentage faster than an average speed of traffic on a road segment. For example, a vehicle may be determined to be driving with excessive speed if the vehicle is driving more than 20% over a historical average speed for the road segment. Other thresholds (e.g., 10% over, 25% over) and/or baselines (e.g., average observed speed at a particular time of day) are contemplated.

FIG. 3.12 is an example flow diagram of example logic illustrating an example embodiment of process 3.1000 of FIG. 3.10. More particularly, FIG. 3.12 illustrates a process 3.1200 that includes the process 3.1000, wherein the determining that the first vehicle is driving with excessive speed includes operations performed by or at one or more of the following block(s).

At block 3.1202, the process performs determining that the first vehicle is traveling at a speed that is more than a threshold number of standard deviations over an average speed of traffic on a road segment. For example, a vehicle may be determined to be driving with excessive speed if the vehicle is driving more than one standard deviation over the historical average speed. Other baselines may be employed, including average speed for a particular time of day, average speed measured over a time window (e.g., 5 or 10 minutes) preceding the current time, or the like.

FIG. 3.13 is an example flow diagram of example logic illustrating an example embodiment of process 3.100 of FIG. 3.1. More particularly, FIG. 3.13 illustrates a process 3.1300 that includes the process 3.100, wherein the road-based device is a sensor attached to a structure proximate to the first vehicle. In some embodiments, the road-based device is attached to a building, utility pole, or some other fixed structure.

FIG. 3.14 is an example flow diagram of example logic illustrating an example embodiment of process 3.1300 of FIG. 3.13. More particularly, FIG. 3.14 illustrates a process 3.1400 that includes the process 3.1300, wherein the structure proximate to the first vehicle is one of a utility pole, a traffic control signal support, and/or a building.

FIG. 3.15 is an example flow diagram of example logic illustrating an example embodiment of process 3.1300 of FIG. 3.13. More particularly, FIG. 3.15 illustrates a process 3.1500 that includes the process 3.1300, wherein the receiving information about a first vehicle includes operations performed by or at one or more of the following block(s).

At block 3.1502, the process performs receiving an image of the first vehicle from a camera deployed at an intersection. For example, the process may receive images from a camera that is fixed to a traffic light or other signal at an intersection near the first vehicle.

FIG. 3.16 is an example flow diagram of example logic illustrating an example embodiment of process 3.1300 of FIG. 3.13. More particularly, FIG. 3.16 illustrates a process 3.1600 that includes the process 3.1300, wherein the receiving information about a first vehicle includes operations performed by or at one or more of the following block(s).

At block 3.1602, the process performs receiving ranging data from a range sensor deployed at an intersection, the ranging data representing a distance between the first vehicle and the intersection. For example, the process may receive a distance (e.g., 75 meters) measured between some known point in the intersection (e.g., the position of the range sensor) and an oncoming vehicle.

FIG. 3.17 is an example flow diagram of example logic illustrating an example embodiment of process 3.1300 of FIG. 3.13. More particularly, FIG. 3.17 illustrates a process 3.1700 that includes the process 3.1300, wherein the road-based device includes a camera. The camera may provide images of the first vehicle and other objects or conditions, which may be analyzed to determine the threat information, as discussed herein.

FIG. 3.18 is an example flow diagram of example logic illustrating an example embodiment of process 3.1300 of FIG. 3.13. More particularly, FIG. 3.18 illustrates a process 3.1800 that includes the process 3.1300, wherein the road-based device includes a microphone. The microphone may provide audio information, which may be used to perform acoustic source localization, as discussed herein.

FIG. 3.19 is an example flow diagram of example logic illustrating an example embodiment of process 3.1300 of FIG. 3.13. More particularly, FIG. 3.19 illustrates a process 3.1900 that includes the process 3.1300, wherein the road-based device includes a radar-based speed sensor. The radar-based speed sensor may provide distance and/or velocity information to the process. The speed sensor may take various forms, including a hand-held radar gun, a dashboard-mounted device, a trailer-mounted device, or the like.

FIG. 3.20 is an example flow diagram of example logic illustrating an example embodiment of process 3.1300 of FIG. 3.13. More particularly, FIG. 3.20 illustrates a process 3.2000 that includes the process 3.1300, wherein the road-based device includes a light detection and ranging-based speed sensor. The light detection and ranging-based speed sensor may use, for example, laser light to measure the vehicle speed and/or position.

FIG. 3.21 is an example flow diagram of example logic illustrating an example embodiment of process 3.1300 of FIG. 3.13. More particularly, FIG. 3.21 illustrates a process 3.2100 that includes the process 3.1300, wherein the road-based device includes a range sensor. Various technologies can be used to provide range information, including sonar, LIDAR, radar, or the like.

FIG. 3.22 is an example flow diagram of example logic illustrating an example embodiment of process 3.1300 of FIG. 3.13. More particularly, FIG. 3.22 illustrates a process 3.2200 that includes the process 3.1300, wherein the road-based device includes a receiver operable to receive motion-related information transmitted from the first vehicle, the motion-related information including at least one of a position of the first vehicle, a velocity of the first vehicle, and/or a trajectory of the first vehicle. In some embodiments, vehicles and/or other entities (e.g., pedestrians) traveling the roadway broadcast or otherwise transmit motion-related information, such as information about position and/or speed of a vehicle. The process may receive such information and use it to model the trajectories of various objects in the roadway to determine whether collisions are likely to occur.

FIG. 3.23 is an example flow diagram of example logic illustrating an example embodiment of process 3.100 of FIG. 3.1. More particularly, FIG. 3.23 illustrates a process 3.2300 that includes the process 3.100, wherein the road-based device is embedded in a roadway being traveled over by the first vehicle. The road-based device may be embedded, buried, or located beneath the surface of the roadway.

FIG. 3.24 is an example flow diagram of example logic illustrating an example embodiment of process 3.2300 of FIG. 3.23. More particularly, FIG. 3.24 illustrates a process 3.2400 that includes the process 3.2300, wherein the road-based device includes one or more induction loops embedded in the roadway, the one or more induction loops configured to detect the presence and/or velocity of the first vehicle. An induction loop detects the presence of a vehicle by generating an electrical current as the vehicle passes over the loop.

FIG. 3.25 is an example flow diagram of example logic illustrating an example embodiment of process 3.2400 of FIG. 3.24. More particularly, FIG. 3.25 illustrates a process 3.2500 that includes the process 3.2400, wherein the receiving information about a first vehicle includes operations performed by or at one or more of the following block(s).

At block 3.2502, the process performs receiving motion-related information from the induction loop, the motion-related information including at least one of a position of the first vehicle, a velocity of the first vehicle, and/or a trajectory of the first vehicle. As noted, induction loops may be embedded in the roadway and configured to detect the presence of vehicles passing over them. Some types of loops and/or processing may be employed to detect other information, including velocity, vehicle size, and the like. Multiple induction loops may be configured to work in concert to measure, for example, vehicle velocity.

FIG. 3.26 is an example flow diagram of example logic illustrating an example embodiment of process 3.100 of FIG. 3.1. More particularly, FIG. 3.26 illustrates a process 3.2600 that includes the process 3.100, wherein the receiving information about a first vehicle includes operations performed by or at one or more of the following block(s).

At block 3.2602, the process performs receiving the information about the first vehicle from a sensor attached to the first vehicle. The first vehicle may include one or more sensors that provide data to the process. For example, the first vehicle may include a camera, a microphone, a GPS receiver, or the like.

FIG. 3.27 is an example flow diagram of example logic illustrating an example embodiment of process 3.100 of FIG. 3.1. More particularly, FIG. 3.27 illustrates a process 3.2700 that includes the process 3.100, wherein the receiving information about a first vehicle includes operations performed by or at one or more of the following block(s).

At block 3.2702, the process performs receiving the information about the first vehicle from a sensor attached to a second vehicle. The process may obtain information from some other vehicle that is not the first vehicle, such as a vehicle that is behind or in front of the first vehicle.

FIG. 3.28 is an example flow diagram of example logic illustrating an example embodiment of process 3.2700 of FIG. 3.27. More particularly, FIG. 3.28 illustrates a process 3.2800 that includes the process 3.2700, wherein the second vehicle is an aerial vehicle. Aerial vehicles, including unmanned vehicles (e.g., drones) may be employed to track and provide information about the first vehicle. For example, a drone may be employed as an instrument platform that travels over a road segment (e.g., a segment of a highway) and feeds data to the process.

FIG. 3.29 is an example flow diagram of example logic illustrating an example embodiment of process 3.2700 of FIG. 3.27. More particularly, FIG. 3.29 illustrates a process 3.2900 that includes the process 3.2700, wherein the second vehicle is a satellite. In some embodiments, a satellite in low Earth orbit may provide data to the process.

FIG. 3.30 is an example flow diagram of example logic illustrating an example embodiment of process 3.100 of FIG. 3.1. More particularly, FIG. 3.30 illustrates a process 3.3000 that includes the process 3.100, wherein the receiving information about a first vehicle includes operations performed by or at one or more of the following block(s).

At block 3.3002, the process performs receiving the information about the first vehicle from a sensor attached to a vehicle that is occupied by the user. In some embodiments, the sensor is attached to a vehicle that is being driven or otherwise operated by the user.

FIG. 3.31 is an example flow diagram of example logic illustrating an example embodiment of process 3.100 of FIG. 3.1. More particularly, FIG. 3.31 illustrates a process 3.3100 that includes the process 3.100, wherein the receiving information about a first vehicle includes operations performed by or at one or more of the following block(s).

At block 3.3102, the process performs receiving the information about the first vehicle from a sensor attached to a vehicle that is operating autonomously. In some embodiments, the sensor is attached to a vehicle that is operating autonomously, such as by utilizing a guidance or other control system to direct the operation of the vehicle.

FIG. 3.32 is an example flow diagram of example logic illustrating an example embodiment of process 3.100 of FIG. 3.1. More particularly, FIG. 3.32 illustrates a process 3.3200 that includes the process 3.100, wherein the receiving information about a first vehicle includes operations performed by or at one or more of the following block(s).

At block 3.3202, the process performs receiving the information about the first vehicle from a sensor of the wearable device. The wearable device may include various devices, such as microphones, cameras, range sensors, or the like, that may provide data to the process.

FIG. 3.33 is an example flow diagram of example logic illustrating an example embodiment of process 3.100 of FIG. 3.1. More particularly, FIG. 3.33 illustrates a process 3.3300 that includes the process 3.100, and which further includes operations performed by or at the following blocks(s).

At block 3.3302, the process performs receiving motion-related information about the first vehicle and/or other objects moving about a roadway. The motion-related information may include information about the mechanics (e.g., position, velocity, acceleration, mass) of the user and/or the first vehicle.

FIG. 3.34 is an example flow diagram of example logic illustrating an example embodiment of process 3.3300 of FIG. 3.33. More particularly, FIG. 3.34 illustrates a process 3.3400 that includes the process 3.3300, wherein the receiving motion-related information includes operations performed by or at one or more of the following block(s).

At block 3.3402, the process performs receiving position information from a position sensor of the first vehicle. In some embodiments, a GPS receiver, dead reckoning, or some combination thereof may be used to track the position of the first vehicle as it moves down the roadway.

FIG. 3.35 is an example flow diagram of example logic illustrating an example embodiment of process 3.3300 of FIG. 3.33. More particularly, FIG. 3.35 illustrates a process 3.3500 that includes the process 3.3300, wherein the receiving motion-related information includes operations performed by or at one or more of the following block(s).

At block 3.3502, the process performs receiving velocity information from a velocity sensor of the first vehicle. In some embodiments, the first vehicle periodically (or on request) transmits its velocity (e.g., as measured by its speedometer) to the process.

FIG. 3.36 is an example flow diagram of example logic illustrating an example embodiment of process 3.3300 of FIG. 3.33. More particularly, FIG. 3.36 illustrates a process 3.3600 that includes the process 3.3300, wherein the determining threat information includes operations performed by or at one or more of the following block(s).

At block 3.3602, the process performs determining the threat information based on the motion-related information about the first vehicle. The process may also or instead consider a variety of motion-related information received from other sources, including the wearable device, some other vehicle, a fixed road-side sensor, or the like.

FIG. 3.37 is an example flow diagram of example logic illustrating an example embodiment of process 3.3600 of FIG. 3.36. More particularly, FIG. 3.37 illustrates a process 3.3700 that includes the process 3.3600, wherein the determining the threat information based on the motion-related information about the first vehicle includes operations performed by or at one or more of the following block(s).

At block 3.3702, the process performs determining the threat information based on information about position, velocity, and/or acceleration of the user obtained from sensors in the wearable device. The wearable device may include position sensors (e.g., GPS), accelerometers, or other devices configured to provide motion-related information about the user to the process.

FIG. 3.38 is an example flow diagram of example logic illustrating an example embodiment of process 3.3600 of FIG. 3.36. More particularly, FIG. 3.38 illustrates a process 3.3800 that includes the process 3.3600, wherein the determining the threat information based on the motion-related information about the first vehicle includes operations performed by or at one or more of the following block(s).

At block 3.3802, the process performs determining the threat information based on information about position, velocity, and/or acceleration of the user obtained from devices in a vehicle of the user. A vehicle occupied or operated by the user may include position sensors (e.g., GPS), accelerometers, speedometers, or other devices configured to provide motion-related information about the user to the process.

FIG. 3.39 is an example flow diagram of example logic illustrating an example embodiment of process 3.3600 of FIG. 3.36. More particularly, FIG. 3.39 illustrates a process 3.3900 that includes the process 3.3600, wherein the determining the threat information based on the motion-related information about the first vehicle includes operations performed by or at one or more of the following block(s).

At block 3.3902, the process performs determining the threat information based on information about position, velocity, and/or acceleration of the first vehicle obtained from devices of the first vehicle. The first vehicle may include position sensors (e.g., GPS), accelerometers, speedometers, or other devices configured to provide motion-related information about the user to the process. In other embodiments, motion-related information may be obtained from other sources, such as a radar gun deployed at the side of a road, from other vehicles, or the like.

FIG. 3.40 is an example flow diagram of example logic illustrating an example embodiment of process 3.100 of FIG. 3.1. More particularly, FIG. 3.40 illustrates a process 3.4000 that includes the process 3.100, wherein the receiving information about a first vehicle includes operations performed by or at one or more of the following block(s).

At block 3.4002, the process performs receiving image data from a camera, the image data representing an image of the first vehicle. The process may receive and consider image data, such as by performing image processing to identify vehicles or other hazards, to determine whether collisions may occur, determine motion-related information about the first vehicle (and possibly other entities), and the like. The image data may be obtained from various sources, including from a camera attached to the wearable device, a vehicle, a road-side structure, or the like.

FIG. 3.41 is an example flow diagram of example logic illustrating an example embodiment of process 3.4000 of FIG. 3.40. More particularly, FIG. 3.41 illustrates a process 3.4100 that includes the process 3.4000, wherein the receiving image data from a camera includes operations performed by or at one or more of the following block(s).

At block 3.4102, the process performs receiving an image from a camera that is attached to one of a road-side structure, the first vehicle, a second vehicle, a vehicle occupied by the user, or the wearable device.

FIG. 3.42 is an example flow diagram of example logic illustrating an example embodiment of process 3.4000 of FIG. 3.40. More particularly, FIG. 3.42 illustrates a process 3.4200 that includes the process 3.4000, wherein the receiving image data from a camera includes operations performed by or at one or more of the following block(s).

At block 3.4202, the process performs receiving video data that includes multiple images of the first vehicle taken at different times. In some embodiments, the image data comprises video data in compressed or raw form. The video data typically includes (or can be reconstructed or decompressed to derive) multiple sequential images taken at distinct times.

FIG. 3.43 is an example flow diagram of example logic illustrating an example embodiment of process 3.4200 of FIG. 3.42. More particularly, FIG. 3.43 illustrates a process 3.4300 that includes the process 3.4200, wherein the receiving video data that includes multiple images of the first vehicle taken at different times includes operations performed by or at one or more of the following block(s).

At block 3.4302, the process performs receiving a first image of the first vehicle taken at a first time.

At block 3.4303, the process performs receiving a second image of the first vehicle taken at a second time, wherein the first and second times are sufficiently different such that velocity and/or direction of travel of the first vehicle may be determined with respect to positions of the first vehicle shown in the first and second images. Various time intervals between images may be utilized. For example, it may not be necessary to receive video data having a high frame rate (e.g., 30 frames per second or higher), because it may be preferable to determine motion or other properties of the first vehicle based on images that are taken at larger time intervals (e.g., one tenth of a second, one quarter of a second). In some embodiments, transmission bandwidth may be saved by transmitting and receiving reduced frame rate image streams.

FIG. 3.44 is an example flow diagram of example logic illustrating an example embodiment of process 3.4000 of FIG. 3.40. More particularly, FIG. 3.44 illustrates a process 3.4400 that includes the process 3.4000, wherein the determining threat information includes operations performed by or at one or more of the following block(s).

At block 3.4402, the process performs identifying the first vehicle in the image data. Image processing techniques may be employed to identify the presence of a vehicle, its type (e.g., car or truck), its size, license plate number, color, or other identifying information about the first vehicle.

FIG. 3.45 is an example flow diagram of example logic illustrating an example embodiment of process 3.4000 of FIG. 3.40. More particularly, FIG. 3.45 illustrates a process 3.4500 that includes the process 3.4000, wherein the determining threat information includes operations performed by or at one or more of the following block(s).

At block 3.4502, the process performs determining whether the first vehicle is moving towards the user based on multiple images represented by the image data. In some embodiments, a video feed or other sequence of images may be analyzed to determine the relative motion of the first vehicle. For example, if the first vehicle appears to be becoming larger over a sequence of images, then it is likely that the first vehicle is moving towards the user.

FIG. 3.46 is an example flow diagram of example logic illustrating an example embodiment of process 3.4000 of FIG. 3.40. More particularly, FIG. 3.46 illustrates a process 3.4600 that includes the process 3.4000, wherein the determining threat information includes operations performed by or at one or more of the following block(s).

At block 3.4602, the process performs determining motion-related information about the first vehicle, based on one or more images of the first vehicle. Motion-related information may include information about the mechanics (e.g., kinematics, dynamics) of the first vehicle, including position, velocity, direction of travel, acceleration, mass, or the like. Motion-related information may be determined for vehicles that are at rest. Motion-related information may be determined and expressed with respect to various frames of reference, including the user's frame of reference, the frame of reference of the first vehicle, a fixed frame of reference, or the like.

FIG. 3.47 is an example flow diagram of example logic illustrating an example embodiment of process 3.4600 of FIG. 3.46. More particularly, FIG. 3.47 illustrates a process 3.4700 that includes the process 3.4600, wherein the determining motion-related information about the first vehicle includes operations performed by or at one or more of the following block(s).

At block 3.4702, the process performs determining the motion-related information with respect to timestamps associated with the one or more images. In some embodiments, the received images include timestamps or other indicators that can be used to determine a time interval between the images. In other cases, the time interval may be known a priori or expressed in other ways, such as in terms of a frame rate associated with an image or video stream.

FIG. 3.48 is an example flow diagram of example logic illustrating an example embodiment of process 3.4600 of FIG. 3.46. More particularly, FIG. 3.48 illustrates a process 3.4800 that includes the process 3.4600, wherein the determining motion-related information about the first vehicle includes operations performed by or at one or more of the following block(s).

At block 3.4802, the process performs determining a position of the first vehicle. The position of the first vehicle may be expressed absolutely, such as via a GPS coordinate or similar representation, or relatively, such as with respect to the position of the user (e.g., 20 meters away from the first user). In addition, the position of the first vehicle may be represented as a point or collection of points (e.g., a region, arc, or line).

FIG. 3.49 is an example flow diagram of example logic illustrating an example embodiment of process 3.4600 of FIG. 3.46. More particularly, FIG. 3.49 illustrates a process 3.4900 that includes the process 3.4600, wherein the determining motion-related information about the first vehicle includes operations performed by or at one or more of the following block(s).

At block 3.4902, the process performs determining a velocity of the first vehicle. The process may determine the velocity of the first vehicle in absolute or relative terms (e.g., with respect to the velocity of the user). The velocity may be expressed or represented as a magnitude (e.g., 10 meters per second), a vector (e.g., having a magnitude and a direction), or the like.

FIG. 3.50 is an example flow diagram of example logic illustrating an example embodiment of process 3.4900 of FIG. 3.49. More particularly, FIG. 3.50 illustrates a process 3.5000 that includes the process 3.4900, wherein the determining a velocity of the first vehicle includes operations performed by or at one or more of the following block(s).

At block 3.5002, the process performs determining the velocity with respect to a fixed frame of reference. In some embodiments, a fixed, global, or absolute frame of reference may be utilized.

FIG. 3.51 is an example flow diagram of example logic illustrating an example embodiment of process 3.4900 of FIG. 3.49. More particularly, FIG. 3.51 illustrates a process 3.5100 that includes the process 3.4900, wherein the determining a velocity of the first vehicle includes operations performed by or at one or more of the following block(s).

At block 3.5102, the process performs determining the velocity with respect to a frame of reference of the user. In some embodiments, velocity is expressed with respect to the user's frame of reference. In such cases, a stationary (e.g., parked) vehicle will appear to be approaching the user if the user is driving towards the first vehicle.

FIG. 3.52 is an example flow diagram of example logic illustrating an example embodiment of process 3.4600 of FIG. 3.46. More particularly, FIG. 3.52 illustrates a process 3.5200 that includes the process 3.4600, wherein the determining motion-related information about the first vehicle includes operations performed by or at one or more of the following block(s).

At block 3.5202, the process performs determining a direction of travel of the first vehicle. The process may determine a direction in which the first vehicle is traveling, such as with respect to the user and/or some absolute coordinate system or frame of reference.

FIG. 3.53 is an example flow diagram of example logic illustrating an example embodiment of process 3.4600 of FIG. 3.46. More particularly, FIG. 3.53 illustrates a process 3.5300 that includes the process 3.4600, wherein the determining motion-related information about the first vehicle includes operations performed by or at one or more of the following block(s).

At block 3.5302, the process performs determining acceleration of the first vehicle. In some embodiments, acceleration of the first vehicle may be determined, for example by determining a rate of change of the velocity of the first vehicle observed over time.

FIG. 3.54 is an example flow diagram of example logic illustrating an example embodiment of process 3.4600 of FIG. 3.46. More particularly, FIG. 3.54 illustrates a process 3.5400 that includes the process 3.4600, wherein the determining motion-related information about the first vehicle includes operations performed by or at one or more of the following block(s).

At block 3.5402, the process performs determining mass of the first vehicle. Mass of the first vehicle may be determined in various ways, including by identifying the type of the first vehicle (e.g., car, truck, motorcycle), determining the size of the first vehicle based on its appearance in an image, or the like.

FIG. 3.55 is an example flow diagram of example logic illustrating an example embodiment of process 3.4000 of FIG. 3.40. More particularly, FIG. 3.55 illustrates a process 3.5500 that includes the process 3.4000, wherein the determining threat information includes operations performed by or at one or more of the following block(s).

At block 3.5502, the process performs identifying objects other than the first vehicle in the image data. Image processing techniques may be employed by the process to identify other objects of interest, including road hazards (e.g., utility poles, ditches, drop-offs), pedestrians, other vehicles, or the like.

FIG. 3.56 is an example flow diagram of example logic illustrating an example embodiment of process 3.4000 of FIG. 3.40. More particularly, FIG. 3.56 illustrates a process 3.5600 that includes the process 3.4000, wherein the determining threat information includes operations performed by or at one or more of the following block(s).

At block 3.5602, the process performs determining driving conditions based on the image data. Image processing techniques may be employed by the process to determine driving conditions, such as surface conditions (e.g., icy, wet), lighting conditions (e.g., glare, darkness), or the like.

FIG. 3.57 is an example flow diagram of example logic illustrating an example embodiment of process 3.100 of FIG. 3.1. More particularly, FIG. 3.57 illustrates a process 3.5700 that includes the process 3.100, wherein the receiving information about a first vehicle includes operations performed by or at one or more of the following block(s).

At block 3.5702, the process performs receiving data representing an audio signal emitted or reflected by the first vehicle. The data representing the audio signal may be raw audio samples, compressed audio data, frequency coefficients, or the like. The data representing the audio signal may represent the sound made by the first vehicle, such as from its engine, a horn, tires, or any other source of sound. The data may also or instead represent audio reflected by the vehicle, such as a sonar ping. In some embodiments, the data representing the audio signal may also or instead include sounds from other sources, including other vehicles, pedestrians, or the like.

FIG. 3.58 is an example flow diagram of example logic illustrating an example embodiment of process 3.5700 of FIG. 3.57. More particularly, FIG. 3.58 illustrates a process 3.5800 that includes the process 3.5700, wherein the receiving data representing an audio signal emitted or reflected by the first vehicle includes operations performed by or at one or more of the following block(s).

At block 3.5802, the process performs receiving data obtained at a microphone array that includes multiple microphones. In some embodiments, a microphone array having two or more microphones is employed to receive audio signals. Differences between the received audio signals may be utilized to perform acoustic source localization or other functions, as discussed further herein.

FIG. 3.59 is an example flow diagram of example logic illustrating an example embodiment of process 3.5800 of FIG. 3.58. More particularly, FIG. 3.59 illustrates a process

3.5900 that includes the process 3.5800, wherein the receiving data obtained at a microphone array includes operations performed by or at one or more of the following block(s).

At block 3.5902, the process performs receiving data obtained at a microphone array, the microphone array coupled to a road-side structure. The array may be fixed to a utility pole, a traffic signal, or the like. In other cases, the microphone array may be situated elsewhere, including on the first vehicle, some other vehicle, the wearable device, or the like.

FIG. 3.60 is an example flow diagram of example logic illustrating an example embodiment of process 3.5700 of FIG. 3.57. More particularly, FIG. 3.60 illustrates a process 3.6000 that includes the process 3.5700, wherein the determining threat information includes operations performed by or at one or more of the following block(s).

At block 3.6002, the process performs determining the threat information based on the data representing the audio signal. As discussed further below, determining the threat information based on audio may include acoustic source localization, frequency analysis, or other techniques that can identify the presence, position, or motion of objects.

FIG. 3.61 is an example flow diagram of example logic illustrating an example embodiment of process 3.6000 of FIG. 3.60. More particularly, FIG. 3.61 illustrates a process 3.6100 that includes the process 3.6000, wherein the determining the threat information based on the data representing the audio signal includes operations performed by or at one or more of the following block(s).

At block 3.6102, the process performs performing acoustic source localization to determine a position of the first vehicle based on multiple audio signals received via multiple microphones. The process may determine a position of the first vehicle by analyzing audio signals received via multiple distinct microphones. For example, engine noise of the first vehicle may have different characteristics (e.g., in volume, in time of arrival, in frequency) as received by different microphones. Differences between the audio signal measured at different microphones may be exploited to determine one or more positions (e.g., points, arcs, lines, regions) at which the first vehicle may be located.

FIG. 3.62 is an example flow diagram of example logic illustrating an example embodiment of process 3.6100 of FIG. 3.61. More particularly, FIG. 3.62 illustrates a process 3.6200 that includes the process 3.6100, wherein the performing acoustic source localization includes operations performed by or at one or more of the following block(s).

At block 3.6202, the process performs receiving an audio signal via a first one of the multiple microphones, the audio signal representing a sound created by the first vehicle. In one approach, at least two microphones are employed. By measuring differences in the arrival time of an audio signal at the two microphones, the position of the first vehicle may be determined. The determined position may be a point, a line, an area, or the like.

At block 3.6204, the process performs receiving the audio signal via a second one of the multiple microphones.

At block 3.6205, the process performs determining the position of the first vehicle by determining a difference between an arrival time of the audio signal at the first microphone and an arrival time of the audio signal at the second microphone. In some embodiments, given information about the distance between the two microphones and the speed of sound, the process may determine the respective distances between each of the two microphones and the first vehicle. Given these two distances (along with the distance between the microphones), the process can solve for the one or more positions at which the first vehicle may be located.

FIG. 3.63 is an example flow diagram of example logic illustrating an example embodiment of process 3.6100 of FIG. 3.61. More particularly, FIG. 3.63 illustrates a process 3.6300 that includes the process 3.6100, wherein the performing acoustic source localization includes operations performed by or at one or more of the following block(s).

At block 3.6302, the process performs triangulating the position of the first vehicle based on a first and second angle, the first angle measured between a first one of the multiple microphones and the first vehicle, the second angle measured between a second one of the multiple microphones and the first vehicle. In some embodiments, the microphones may be directional, in that they may be used to determine the direction from which the sound is coming. Given such information, the process may use triangulation techniques to determine the position of the first vehicle.

FIG. 3.64 is an example flow diagram of example logic illustrating an example embodiment of process 3.6000 of FIG. 3.60. More particularly, FIG. 3.64 illustrates a process 3.6400 that includes the process 3.6000, wherein the determining the threat information based on the data representing the audio signal includes operations performed by or at one or more of the following block(s).

At block 3.6402, the process performs performing a Doppler analysis of the data representing the audio signal to determine whether the first vehicle is approaching the user. The process may analyze whether the frequency of the audio signal is shifting in order to determine whether the first vehicle is approaching or departing the position of the user. For example, if the frequency is shifting higher, the first vehicle may be determined to be approaching the user. Note that the determination is typically made from the frame of reference of the user (who may be moving or not). Thus, the first vehicle may be determined to be approaching the user when, as viewed from a fixed frame of reference, the user is approaching the first vehicle (e.g., a moving user traveling towards a stationary vehicle) or the first vehicle is approaching the user (e.g., a moving vehicle approaching a stationary user). In other embodiments, other frames of reference may be employed, such as a fixed frame, a frame associated with the first vehicle, or the like.

FIG. 3.65 is an example flow diagram of example logic illustrating an example embodiment of process 3.6400 of FIG. 3.64. More particularly, FIG. 3.65 illustrates a process 3.6500 that includes the process 3.6400, wherein the performing a Doppler analysis includes operations performed by or at one or more of the following block(s).

At block 3.6502, the process performs determining whether frequency of the audio signal is increasing or decreasing.

FIG. 3.66 is an example flow diagram of example logic illustrating an example embodiment of process 3.6000 of FIG. 3.60. More particularly, FIG. 3.66 illustrates a process 3.6600 that includes the process 3.6000, wherein the determining the threat information based on the data representing the audio signal includes operations performed by or at one or more of the following block(s).

At block 3.6602, the process performs performing a volume analysis of the data representing the audio signal to determine whether the first vehicle is approaching the user. The process may analyze whether the volume (e.g., amplitude) of the audio signal is shifting in order to determine whether the first vehicle is approaching or departing the position of the user. As noted, different embodiments may use different frames of reference when making this determination.

FIG. 3.67 is an example flow diagram of example logic illustrating an example embodiment of process 3.6600 of FIG. 3.66. More particularly, FIG. 3.67 illustrates a process 3.6700 that includes the process 3.6600, wherein the performing a volume analysis includes operations performed by or at one or more of the following block(s).

At block 3.6702, the process performs determining whether volume of the audio signal is increasing or decreasing.

FIG. 3.68 is an example flow diagram of example logic illustrating an example embodiment of process 3.100 of FIG. 3.1. More particularly, FIG. 3.68 illustrates a process 3.6800 that includes the process 3.100, wherein the determining threat information includes operations performed by or at one or more of the following block(s).

At block 3.6802, the process performs determining threat information that is not related to the first vehicle. The process may determine threat information that is not due or otherwise related to the first vehicle, including based on a variety of other factors or information, such as driving conditions, the presence or absence of other vehicles, the presence or absence of pedestrians, or the like.

FIG. 3.69 is an example flow diagram of example logic illustrating an example embodiment of process 3.6800 of FIG. 3.68. More particularly, FIG. 3.69 illustrates a process 3.6900 that includes the process 3.6800, wherein the determining threat information that is not related to the first vehicle includes operations performed by or at one or more of the following block(s).

At block 3.6902, the process performs receiving and processing information about objects and/or conditions aside from the first vehicle. At least some of the received information may include images of things other than the first vehicle, such as other vehicles, pedestrians, driving conditions, and the like.

FIG. 3.70 is an example flow diagram of example logic illustrating an example embodiment of process 3.6900 of FIG. 3.69. More particularly, FIG. 3.70 illustrates a process 3.7000 that includes the process 3.6900, wherein the receiving and processing information about objects and/or conditions aside from the first vehicle includes operations performed by or at one or more of the following block(s).

At block 3.7002, the process performs receiving information about at least one of a stationary object, a pedestrian, and/or an animal. A stationary object may be a fence, guardrail, utility pole, building, parked vehicle, or the like.

FIG. 3.71 is an example flow diagram of example logic illustrating an example embodiment of process 3.6800 of FIG. 3.68. More particularly, FIG. 3.71 illustrates a process 3.7100 that includes the process 3.6800, wherein the determining threat information that is not related to the first vehicle includes operations performed by or at one or more of the following block(s).

At block 3.7102, the process performs processing the information about the first vehicle to determine the threat information that is not related to the first vehicle. For example, when the received information is image data, the process may determine that a difficult lighting condition exists due to glare or overexposure detected in the image data. As another example, the process may identify a pedestrian in the roadway depicted in the image data. As another example, the process may determine that poor road surface conditions exist, such as due to water or oil on the road surface.

FIG. 3.72 is an example flow diagram of example logic illustrating an example embodiment of process 3.6800 of FIG. 3.68. More particularly, FIG. 3.72 illustrates a process 3.7200 that includes the process 3.6800, wherein the determining threat information that is not related to the first vehicle includes operations performed by or at one or more of the following block(s).

At block 3.7202, the process performs processing information other than the information about the first vehicle to determine the threat information that is not related to the first vehicle. The process may analyze data other than the received information about the first vehicle, such as weather data (e.g., temperature, precipitation), time of day, traffic information, position or motion sensor information (e.g., obtained from GPS systems or accelerometers) related to other vehicles, or the like.

FIG. 3.73 is an example flow diagram of example logic illustrating an example embodiment of process 3.6800 of FIG. 3.68. More particularly, FIG. 3.73 illustrates a process 3.7300 that includes the process 3.6800, wherein the determining threat information that is not related to the first vehicle includes operations performed by or at one or more of the following block(s).

At block 3.7302, the process performs determining that poor driving conditions exist. Poor driving conditions may include or be based on weather information (e.g., snow, rain, ice, temperature), time information (e.g., night or day), lighting information (e.g., a light sensor indicating that the user is traveling towards the setting sun), or the like.

FIG. 3.74 is an example flow diagram of example logic illustrating an example embodiment of process 3.7300 of FIG. 3.73. More particularly, FIG. 3.74 illustrates a process 3.7400 that includes the process 3.7300, wherein the determining that poor driving conditions exist includes operations performed by or at one or more of the following block(s).

At block 3.7402, the process performs determining that adverse weather conditions exist. Adverse weather conditions may be determined based on weather information received from a weather information system or sensor, such as indications of the current temperature, precipitation, or the like.

FIG. 3.75 is an example flow diagram of example logic illustrating an example embodiment of process 3.7300 of FIG. 3.73. More particularly, FIG. 3.75 illustrates a process 3.7500 that includes the process 3.7300, wherein the determining that poor driving conditions exist includes operations performed by or at one or more of the following block(s).

At block 3.7502, the process performs determining that a road construction project is present in proximity to the user. The process may receive information from a traffic information system that identifies road segments upon which road construction is present.

FIG. 3.76 is an example flow diagram of example logic illustrating an example embodiment of process 3.6800 of FIG. 3.68. More particularly, FIG. 3.76 illustrates a process 3.7600 that includes the process 3.6800, wherein the determining threat information that is not related to the first vehicle includes operations performed by or at one or more of the following block(s).

At block 3.7602, the process performs determining that a limited visibility condition exists. Limited visibility may be due to the time of day (e.g., at dusk, dawn, or night), weather (e.g., fog, rain), or the like.

FIG. 3.77 is an example flow diagram of example logic illustrating an example embodiment of process 3.6800 of FIG. 3.68. More particularly, FIG. 3.77 illustrates a process 3.7700 that includes the process 3.6800, wherein the determining threat information that is not related to the first vehicle includes operations performed by or at one or more of the following block(s).

At block 3.7702, the process performs determining that there is slow traffic in proximity to the user. The process may receive and integrate information from traffic information systems (e.g., that report accidents), other vehicles (e.g., that are reporting their speeds), or the like.

FIG. 3.78 is an example flow diagram of example logic illustrating an example embodiment of process 3.7700 of FIG. 3.77. More particularly, FIG. 3.78 illustrates a process 3.7800 that includes the process 3.7700, wherein the determining that there is slow traffic in proximity to the user includes operations performed by or at one or more of the following block(s).

At block 3.7802, the process performs receiving information from a traffic information system regarding traffic congestion on a road traveled by the user. Traffic information systems may provide fine-grained traffic information, such as current average speeds measured on road segments in proximity to the user.

FIG. 3.79 is an example flow diagram of example logic illustrating an example embodiment of process 3.7700 of FIG. 3.77. More particularly, FIG. 3.79 illustrates a process 3.7900 that includes the process 3.7700, wherein the determining that there is slow traffic in proximity to the user includes operations performed by or at one or more of the following block(s).

At block 3.7902, the process performs determining that one or more vehicles are traveling slower than an average or posted speed for a road traveled by the user. Slow travel may be determined based on the speed of one or more vehicles with respect to various baselines, such as average observed speed (e.g., recorded over time, based on time of day, etc.), posted speed limits, recommended speeds based on conditions, or the like.

FIG. 3.80 is an example flow diagram of example logic illustrating an example embodiment of process 3.6800 of FIG. 3.68. More particularly, FIG. 3.80 illustrates a process 3.8000 that includes the process 3.6800, wherein the determining threat information that is not related to the first vehicle includes operations performed by or at one or more of the following block(s).

At block 3.8002, the process performs determining that poor surface conditions exist on a roadway traveled by the user. Poor surface conditions may be due to weather (e.g., ice, snow, rain), temperature, surface type (e.g., gravel road), foreign materials (e.g., oil), or the like.

FIG. 3.81 is an example flow diagram of example logic illustrating an example embodiment of process 3.6800 of FIG. 3.68. More particularly, FIG. 3.81 illustrates a process 3.8100 that includes the process 3.6800, wherein the determining threat information that is not related to the first vehicle includes operations performed by or at one or more of the following block(s).

At block 3.8102, the process performs determining that there is a pedestrian in proximity to the user. The presence of pedestrians may be determined in various ways. In some embodiments, the process may utilize image processing techniques to recognize pedestrians in received image data. In other embodiments pedestrians may wear devices that transmit their location and/or presence. In other embodiments, pedestrians may be detected based on their heat signature, such as by an infrared sensor on the wearable device, user vehicle, or the like.

FIG. 3.82 is an example flow diagram of example logic illustrating an example embodiment of process 3.6800 of FIG. 3.68. More particularly, FIG. 3.82 illustrates a process 3.8200 that includes the process 3.6800, wherein the determining threat information that is not related to the first vehicle includes operations performed by or at one or more of the following block(s).

At block 3.8202, the process performs determining that there is an accident in proximity to the user. Accidents may be identified based on traffic information systems that report accidents, vehicle-based systems that transmit when collisions have occurred, or the like.

FIG. 3.83 is an example flow diagram of example logic illustrating an example embodiment of process 3.6800 of FIG. 3.68. More particularly, FIG. 3.83 illustrates a process 3.8300 that includes the process 3.6800, wherein the determining threat information that is not related to the first vehicle includes operations performed by or at one or more of the following block(s).

At block 3.8302, the process performs determining that there is an animal in proximity to the user. The presence of an animal may be determined as discussed with respect to pedestrians, above.

FIG. 3.84 is an example flow diagram of example logic illustrating an example embodiment of process 3.100 of FIG. 3.1. More particularly, FIG. 3.84 illustrates a process 3.8400 that includes the process 3.100, wherein the determining threat information includes operations performed by or at one or more of the following block(s).

At block 3.8402, the process performs determining the threat information based on gaze information associated with the user. In some embodiments, the process may consider the direction in which the user is looking when determining the threat information. For example, the threat information may depend on whether the user is or is not looking at the first vehicle, as discussed further below.

FIG. 3.85 is an example flow diagram of example logic illustrating an example embodiment of process 3.8400 of FIG. 3.84. More particularly, FIG. 3.85 illustrates a process 3.8500 that includes the process 3.8400, and which further includes operations performed by or at the following blocks(s).

At block 3.8502, the process performs receiving an indication of a direction in which the user is looking. In some embodiments, an orientation sensor such as a gyroscope or accelerometer may be employed to determine the orientation of the user's head, face, or other body part. In some embodiments, a camera or other image sensing device may track the orientation of the user's eyes.

At block 3.8504, the process performs determining that the user is not looking towards the first vehicle. As noted, the process may track the position of the first vehicle. Given this information, coupled with information about the direction of the user's gaze, the process may determine whether or not the user is (or likely is) looking in the direction of the first vehicle.

At block 3.8506, the process performs in response to determining that the user is not looking towards the first vehicle, directing the user to look towards the first vehicle. When it is determined that the user is not looking at the first vehicle, the process may warn or otherwise direct the user to look in that direction, such as by saying or otherwise presenting "Look right!", "Car on your left," or similar message.

FIG. 3.86 is an example flow diagram of example logic illustrating an example embodiment of process 3.100 of FIG. 3.1. More particularly, FIG. 3.86 illustrates a process 3.8600 that includes the process 3.100, and which further includes operations performed by or at the following blocks(s).

At block 3.8602, the process performs identifying multiple threats to the user. The process may in some cases identify multiple potential threats, such as one car approaching the user from behind and another car approaching the user from the left.

At block 3.8604, the process performs identifying a first one of the multiple threats that is more significant than at least one other of the multiple threats. The process may rank, order, or otherwise evaluate the relative significance or risk presented by each of the identified threats. For example, the process may determine that a truck approaching from the right is a bigger risk than a bicycle approaching from behind. On the other hand, if the truck is moving very slowly (thus leaving more time for the truck and/or the user to avoid it) compared to the bicycle, the process may instead determine that the bicycle is the bigger risk.

At block 3.8607, the process performs instructing the user to avoid the first one of the multiple threats. Instructing the user may include outputting a command or suggestion to take (or not take) a particular course of action.

FIG. 3.87 is an example flow diagram of example logic illustrating an example embodiment of process 3.8600 of FIG. 3.86. More particularly, FIG. 3.87 illustrates a process 3.8700 that includes the process 3.8600, and which further includes operations performed by or at the following blocks(s).

At block 3.8702, the process performs modeling multiple potential accidents that each correspond to one of the multiple threats to determine a collision force associated with each accident. In some embodiments, the process models the physics of various objects to determine potential collisions and possibly their severity and/or likelihood. For example, the process may determine an expected force of a collision based on factors such as object mass, velocity, acceleration, deceleration, or the like.

At block 3.8704, the process performs selecting the first threat based at least in part on which of the multiple accidents has the highest collision force. In some embodiments, the process considers the threat having the highest associated collision force when determining most significant threat, because that threat will likely result in the greatest injury to the user.

FIG. 3.88 is an example flow diagram of example logic illustrating an example embodiment of process 3.8600 of FIG. 3.86. More particularly, FIG. 3.88 illustrates a process 3.8800 that includes the process 3.8600, and which further includes operations performed by or at the following blocks(s).

At block 3.8802, the process performs determining a likelihood of an accident associated with each of the multiple threats. In some embodiments, the process associates a likelihood (probability) with each of the multiple threats. Such a probability may be determined with respect to a physical model that represents uncertainty with respect to the mechanics of the various objects that it models.

At block 3.8804, the process performs selecting the first threat based at least in part on which of the multiple threats has the highest associated likelihood. The process may consider the threat having the highest associated likelihood when determining the most significant threat.

FIG. 3.89 is an example flow diagram of example logic illustrating an example embodiment of process 3.8600 of FIG. 3.86. More particularly, FIG. 3.89 illustrates a process 3.8900 that includes the process 3.8600, and which further includes operations performed by or at the following blocks(s).

At block 3.8902, the process performs determining a mass of an object associated with each of the multiple threats. In some embodiments, the process may consider the mass of threat objects, based on the assumption that those objects having higher mass (e.g., a truck) pose greater threats than those having a low mass (e.g., a pedestrian).

At block 3.8904, the process performs selecting the first threat based at least in part on which of the objects has the highest mass.

FIG. 3.90 is an example flow diagram of example logic illustrating an example embodiment of process 3.8600 of FIG. 3.86. More particularly, FIG. 3.90 illustrates a process 3.9000 that includes the process 3.8600, wherein the identifying a first one of the multiple threats that is more significant than at least one other of the multiple threats includes operations performed by or at one or more of the following block(s).

At block 3.9002, the process performs selecting the most significant threat from the multiple threats. Threat significance may be based on a variety of factors, including likelihood, cost, potential injury type, and the like.

FIG. 3.91 is an example flow diagram of example logic illustrating an example embodiment of process 3.100 of FIG. 3.1. More particularly, FIG. 3.91 illustrates a process 3.9100 that includes the process 3.100, and which further includes operations performed by or at the following blocks(s).

At block 3.9102, the process performs determining that an evasive action with respect to the first vehicle poses a threat to some other object. The process may consider whether potential evasive actions pose threats to other objects. For example, the process may analyze whether directing the user to turn right would cause the user to collide with a pedestrian or some fixed object, which may actually result in a worse outcome (e.g., for the user and/or the pedestrian) than colliding with the first vehicle.

At block 3.9104, the process performs instructing the user to take some other evasive action that poses a lesser threat to the some other object. The process may rank or otherwise order evasive actions (e.g., slow down, turn left, turn right) based at least in part on the risks or threats those evasive actions pose to other entities.

FIG. 3.92 is an example flow diagram of example logic illustrating an example embodiment of process 3.100 of FIG. 3.1. More particularly, FIG. 3.92 illustrates a process 3.9200 that includes the process 3.100, and which further includes operations performed by or at the following blocks(s).

At block 3.9202, the process performs identifying multiple threats that each have an associated likelihood and cost. In some embodiments, the process may perform a cost-minimization analysis, in which it considers multiple threats, including threats posed to the user and to others, and selects a threat that minimizes or reduces expected costs. The process may also consider threats posed by actions taken by the user to avoid other threats.

At block 3.9206, the process performs determining a course of action that minimizes an expected cost with respect to the multiple threats. Expected cost of a threat may be expressed as a product of the likelihood of damage associated with the threat and the cost associated with such damage.

FIG. 3.93 is an example flow diagram of example logic illustrating an example embodiment of process 3.9200 of FIG. 3.92. More particularly, FIG. 3.93 illustrates a process 3.9300 that includes the process 3.9200, wherein the cost is based on one or more of a cost of damage to a vehicle, a cost of injury or death of a human, a cost of injury or death of an animal, a cost of damage to a structure, a cost of emotional distress, and/or cost to a business or person based on negative publicity associated with an accident.

FIG. 3.94 is an example flow diagram of example logic illustrating an example embodiment of process 3.9200 of FIG. 3.92. More particularly, FIG. 3.94 illustrates a process 3.9400 that includes the process 3.9200, wherein the identifying multiple threats includes operations performed by or at one or more of the following block(s).

At block 3.9402, the process performs identifying multiple threats that are each related to different persons or things. In some embodiments, the process considers risks related to multiple distinct entities, possibly including the user.

FIG. 3.95 is an example flow diagram of example logic illustrating an example embodiment of process 3.9200 of FIG. 3.92. More particularly, FIG. 3.95 illustrates a process 3.9500 that includes the process 3.9200, wherein the identifying multiple threats includes operations performed by or at one or more of the following block(s).

At block 3.9502, the process performs identifying multiple threats that are each related to the user. In some embodiments, the process also or only considers risks that are related to the user.

FIG. 3.96 is an example flow diagram of example logic illustrating an example embodiment of process 3.9200 of FIG. 3.92. More particularly, FIG. 3.96 illustrates a process 3.9600 that includes the process 3.9200, wherein the determining a course of action that minimizes an expected cost includes operations performed by or at one or more of the following block(s).

At block 3.9602, the process performs minimizing expected costs to the user posed by the multiple threats. In some embodiments, the process attempts to minimize those costs borne by the user. Note that this may cause the process to recommend a course of action that is not optimal from a societal perspective, such as by directing the user to drive his car over a pedestrian rather than to crash into a car or structure.

FIG. 3.97 is an example flow diagram of example logic illustrating an example embodiment of process 3.9200 of FIG. 3.92. More particularly, FIG. 3.97 illustrates a process 3.9700 that includes the process 3.9200, wherein the determining a course of action that minimizes an expected cost includes operations performed by or at one or more of the following block(s).

At block 3.9702, the process performs minimizing overall expected costs posed by the multiple threats, the overall expected costs being a sum of expected costs borne by the user and other persons/things. In some embodiments, the process attempts to minimize social costs, that is, the costs borne by the various parties to an accident. Note that this may cause the process to recommend a course of action that may have a high cost to the user (e.g., crashing into a wall and damaging the user's car) to spare an even higher cost to another person (e.g., killing a pedestrian).

FIG. 3.98 is an example flow diagram of example logic illustrating an example embodiment of process 3.100 of FIG. 3.1. More particularly, FIG. 3.98 illustrates a process 3.9800 that includes the process 3.100, wherein the presenting the threat information includes operations performed by or at one or more of the following block(s).

At block 3.9802, the process performs presenting the threat information via an audio output device of the wearable device. The process may play an alarm, bell, chime, voice message, or the like that warns or otherwise informs the user of the threat information. The wearable device may include audio speakers operable to output audio signals, including as part of a set of earphones, earbuds, a headset, a helmet, or the like.

FIG. 3.99 is an example flow diagram of example logic illustrating an example embodiment of process 3.100 of FIG. 3.1. More particularly, FIG. 3.99 illustrates a process 3.9900 that includes the process 3.100, wherein the presenting the threat information includes operations performed by or at one or more of the following block(s).

At block 3.9902, the process performs presenting the threat information via a visual display device of the wearable device. In some embodiments, the wearable device includes a display screen or other mechanism for presenting visual information. For example, when the wearable device is a helmet, a face shield of the helmet may be used as a type of heads-up display for presenting the threat information.

FIG. 3.100 is an example flow diagram of example logic illustrating an example embodiment of process 3.9900 of FIG. 3.99. More particularly, FIG. 3.100 illustrates a process 3.10000 that includes the process 3.9900, wherein the presenting the threat information via a visual display device includes operations performed by or at one or more of the following block(s).

At block 3.10002, the process performs displaying an indicator that instructs the user to look towards the first vehicle. The displayed indicator may be textual (e.g., "Look right!"), iconic (e.g., an arrow), or the like.

FIG. 3.101 is an example flow diagram of example logic illustrating an example embodiment of process 3.9900 of FIG. 3.99. More particularly, FIG. 3.101 illustrates a process 3.10100 that includes the process 3.9900, wherein the presenting the threat information via a visual display device includes operations performed by or at one or more of the following block(s).

At block 3.10102, the process performs displaying an indicator that instructs the user to accelerate, decelerate, and/or turn. An example indicator may be or include the text "Speed up," "slow down," "turn left," or similar language.

FIG. 3.102 is an example flow diagram of example logic illustrating an example embodiment of process 3.100 of FIG. 3.1. More particularly, FIG. 3.102 illustrates a process 3.10200 that includes the process 3.100, wherein the presenting the threat information includes operations performed by or at one or more of the following block(s).

At block 3.10202, the process performs directing the user to accelerate.

FIG. 3.103 is an example flow diagram of example logic illustrating an example embodiment of process 3.100 of FIG. 3.1. More particularly, FIG. 3.103 illustrates a process 3.10300 that includes the process 3.100, wherein the presenting the threat information includes operations performed by or at one or more of the following block(s).

At block 3.10302, the process performs directing the user to decelerate.

FIG. 3.104 is an example flow diagram of example logic illustrating an example embodiment of process 3.100 of FIG. 3.1. More particularly, FIG. 3.104 illustrates a process 3.10400 that includes the process 3.100, wherein the presenting the threat information includes operations performed by or at one or more of the following block(s).

At block 3.10402, the process performs directing the user to turn. In some embodiments, the process may provide "turn assistance," by helping drivers better understand when it is appropriate to make a turn across one or more lanes of oncoming traffic. In such an embodiment, the process tracks vehicles as they approach in intersection to determine whether a vehicle waiting to turn across oncoming lanes of traffic has sufficient cross the lanes without colliding with the approaching vehicles.

FIG. 3.105 is an example flow diagram of example logic illustrating an example embodiment of process 3.100 of FIG. 3.1. More particularly, FIG. 3.105 illustrates a process 3.10500 that includes the process 3.100, wherein the presenting the threat information includes operations performed by or at one or more of the following block(s).

At block 3.10502, the process performs directing the user not to turn. As noted, some embodiments provide a turn assistance feature for helping driving to make safe turns across lanes of oncoming traffic.

FIG. 3.106 is an example flow diagram of example logic illustrating an example embodiment of process 3.100 of FIG. 3.1. More particularly, FIG. 3.106 illustrates a process 3.10600 that includes the process 3.100, and which further includes operations performed by or at the following blocks(s).

At block 3.10602, the process performs transmitting to the first vehicle a warning based on the threat information. The process may send or otherwise transmit a warning or other message to the first vehicle that instructs the operator of the first vehicle to take evasive action. The instruction to the first vehicle may be complimentary to any instructions given to the user, such that if both instructions are followed, the risk of collision decreases. In this manner, the process may help avoid a situation in which the user and the operator of the first vehicle take actions that actually increase the risk of collision, such as may occur when the user and the first vehicle are approaching head but do not turn away from one another.

FIG. 3.107 is an example flow diagram of example logic illustrating an example embodiment of process 3.100 of FIG. 3.1. More particularly, FIG. 3.107 illustrates a process 3.10700 that includes the process 3.100, and which further includes operations performed by or at the following blocks(s).

At block 3.10702, the process performs presenting the threat information via an output device of a vehicle of the user, the output device including a visual display and/or an audio speaker. In some embodiments, the process may use other devices to output the threat information, such as output devices of a vehicle of the user, including a car stereo, dashboard display, or the like.

FIG. 3.108 is an example flow diagram of example logic illustrating an example embodiment of process 3.100 of FIG. 3.1. More particularly, FIG. 3.108 illustrates a process 3.10800 that includes the process 3.100, wherein the wearable device is a helmet worn by the user. Various types of helmets are contemplated, including motorcycle helmets, bicycle helmets, and the like.

FIG. 3.109 is an example flow diagram of example logic illustrating an example embodiment of process 3.100 of FIG. 3.1. More particularly, FIG. 3.109 illustrates a process 3.10900 that includes the process 3.100, wherein the wearable device is goggles worn by the user.

FIG. 3.110 is an example flow diagram of example logic illustrating an example embodiment of process 3.100 of FIG. 3.1. More particularly, FIG. 3.110 illustrates a process 3.11000 that includes the process 3.100, wherein the wearable device is eyeglasses worn by the user.

FIG. 3.111 is an example flow diagram of example logic illustrating an example embodiment of process 3.100 of FIG. 3.1. More particularly, FIG. 3.111 illustrates a process 3.11100 that includes the process 3.100, wherein the presenting the threat information includes operations performed by or at one or more of the following block(s).

At block 3.11102, the process performs presenting the threat information via goggles worn by the user. The goggles may include a small display, an audio speaker, or haptic output device, or the like.

FIG. 3.112 is an example flow diagram of example logic illustrating an example embodiment of process 3.100 of FIG. 3.1. More particularly, FIG. 3.112 illustrates a process 3.11200 that includes the process 3.100, wherein the presenting the threat information includes operations performed by or at one or more of the following block(s).

At block 3.11202, the process performs presenting the threat information via a helmet worn by the user. The helmet may include an audio speaker or visual output device, such as a display that presents information on the inside of the face screen of the helmet. Other output devices, including haptic devices, are contemplated.

FIG. 3.113 is an example flow diagram of example logic illustrating an example embodiment of process 3.100 of FIG. 3.1. More particularly, FIG. 3.113 illustrates a process 3.11300 that includes the process 3.100, wherein the presenting the threat information includes operations performed by or at one or more of the following block(s).

At block 3.11302, the process performs presenting the threat information via a hat worn by the user. The hat may include an audio speaker or similar output device.

FIG. 3.114 is an example flow diagram of example logic illustrating an example embodiment of process 3.100 of FIG. 3.1. More particularly, FIG. 3.114 illustrates a process 3.11400 that includes the process 3.100, wherein the presenting the threat information includes operations performed by or at one or more of the following block(s).

At block 3.11402, the process performs presenting the threat information via eyeglasses worn by the user. The eyeglasses may include a small display, an audio speaker, or haptic output device, or the like.

FIG. 3.115 is an example flow diagram of example logic illustrating an example embodiment of process 3.100 of FIG. 3.1. More particularly, FIG. 3.115 illustrates a process 3.11500 that includes the process 3.100, wherein the presenting the threat information includes operations performed by or at one or more of the following block(s).

At block 3.11502, the process performs presenting the threat information via audio speakers that are part of at least one of earphones, a headset, earbuds, and/or a hearing aid. The audio speakers may be integrated into the wearable device. In other embodiments, other audio speakers (e.g., of a car stereo) may be employed instead or in addition.

FIG. 3.116 is an example flow diagram of example logic illustrating an example embodiment of process 3.100 of FIG. 3.1. More particularly, FIG. 3.116 illustrates a process 3.11600 that includes the process 3.100, and which further includes operations performed by or at the following blocks(s).

At block 3.11602, the process performs performing at the road-based device the determining threat information and/or the presenting the threat information. In some embodiments, the road-based device may be responsible for performing one or more of the operations of the process. For example, the road-based device may be or include a computing system situated at or about a street intersection configured to receive and analyze information about vehicles that are entering or nearing the intersection.

At block 3.11604, the process performs transmitting the threat information from the road-based device to the wearable device of the user. For example, when the road-based computing system determines that two vehicles may be on a collision course, the computing system can transmit threat information to the wearable device so that the user can take evasive action and avoid a possible accident.

FIG. 3.117 is an example flow diagram of example logic illustrating an example embodiment of process 3.100 of FIG. 3.1. More particularly, FIG. 3.117 illustrates a process 3.11700 that includes the process 3.100, and which further includes operations performed by or at the following blocks(s).

At block 3.11702, the process performs performing on a computing system that is remote from the road-based device the determining threat information and/or the presenting the threat information. In some embodiments, a remote computing system may be responsible for performing one or more of the operations of the process. For example, the road-based device may forward the received information to a cloud-based computing system where it is analyzed to determine the threat information.

At block 3.11704, the process performs transmitting the threat information from the road-based device to the wearable device of the user. The cloud-based computing system can transmit threat information to the wearable device so that the user can take evasive action and avoid a possible accident.

FIG. 3.118 is an example flow diagram of example logic illustrating an example embodiment of process 3.100 of FIG. 3.1. More particularly, FIG. 3.118 illustrates a process 3.11800 that includes the process 3.100, and which further includes operations performed by or at the following blocks(s).

At block 3.11802, the process performs receiving data representing threat information relevant to a second vehicle, the second vehicle not being used for travel by the user. As noted, threat information may in some embodiments be shared amongst vehicles, entities, devices, or systems present in a roadway. For example, a second vehicle may have stalled in an intersection that is being approached by the user. This second vehicle may then transmit the fact that it has stalled to the process, which in turn forwards an instruction to slow down to the user. As another example, the second vehicle may transmit an indication of an icy surface condition, which is then forwarded by the process to the user.

At block 3.11805, the process performs determining the threat information based on the data representing threat information relevant to the second vehicle. Having received threat information from the second vehicle, the process may determine that it is also relevant to the user, and then accordingly present it to the user.

FIG. 3.119 is an example flow diagram of example logic illustrating an example embodiment of process 3.11800 of FIG. 3.118. More particularly, FIG. 3.119 illustrates a process 3.11900 that includes the process 3.11800, wherein the receiving data representing threat information relevant to a second vehicle includes operations performed by or at one or more of the following block(s).

At block 3.11902, the process performs receiving from the second vehicle an indication of stalled or slow traffic encountered by the second vehicle. Various types of threat information relevant to the second vehicle may be provided to the process, such as that there is stalled or slow traffic ahead of the second vehicle.

FIG. 3.120 is an example flow diagram of example logic illustrating an example embodiment of process 3.11800 of FIG. 3.118. More particularly, FIG. 3.120 illustrates a process 3.12000 that includes the process 3.11800, wherein the receiving data representing threat information relevant to a second vehicle includes operations performed by or at one or more of the following block(s).

At block 3.12002, the process performs receiving from the second vehicle an indication of poor driving conditions experienced by the second vehicle. The second vehicle may share the fact that it is experiencing poor driving conditions, such as an icy or wet roadway.

FIG. 3.121 is an example flow diagram of example logic illustrating an example embodiment of process 3.11800 of FIG. 3.118. More particularly, FIG. 3.121 illustrates a process 3.12100 that includes the process 3.11800, wherein the receiving data representing threat information relevant to a second vehicle includes operations performed by or at one or more of the following block(s).

At block 3.12102, the process performs receiving from the second vehicle an indication that the first vehicle is driving erratically. The second vehicle may share a determination that the first vehicle is driving erratically, such as by swerving, driving with excessive speed, driving too slowly, or the like.

FIG. 3.122 is an example flow diagram of example logic illustrating an example embodiment of process 3.11800 of FIG. 3.118. More particularly, FIG. 3.122 illustrates a process 3.12200 that includes the process 3.11800, wherein the receiving data representing threat information relevant to a second vehicle includes operations performed by or at one or more of the following block(s).

At block 3.12202, the process performs receiving from the second vehicle an image of the first vehicle. The second vehicle may include one or more cameras, and may share images obtained via those cameras with other entities.

FIG. 3.123 is an example flow diagram of example logic illustrating an example embodiment of process 3.100 of FIG. 3.1. More particularly, FIG. 3.123 illustrates a process 3.12300 that includes the process 3.100, and which further includes operations performed by or at the following blocks(s).

At block 3.12302, the process performs transmitting the threat information to a second vehicle. As noted, threat information may in some embodiments be shared amongst vehicles, entities, devices, or systems present in a roadway. In this example, the threat information is transmitted to a second vehicle (e.g., one following behind the user), so that the second vehicle may benefit from the determined threat information as well.

FIG. 3.124 is an example flow diagram of example logic illustrating an example embodiment of process 3.12300 of FIG. 3.123. More particularly, FIG. 3.124 illustrates a process 3.12400 that includes the process 3.12300, wherein the transmitting the threat information to a second vehicle includes operations performed by or at one or more of the following block(s).

At block 3.12402, the process performs transmitting the threat information to an intermediary server system for distribution to other vehicles in proximity to the user. In some embodiments, intermediary systems may operate as relays for sharing the threat information with other vehicles and users of a roadway.

FIG. 3.125 is an example flow diagram of example logic illustrating an example embodiment of process 3.100 of FIG. 3.1. More particularly, FIG. 3.125 illustrates a process 3.12500 that includes the process 3.100, and which further includes operations performed by or at the following blocks(s).

At block 3.12502, the process performs transmitting the threat information to a second road-based device situated along a projected course of travel of the first vehicle. For example, the process may transmit the threat information to a second road-based device located at a next intersection or otherwise further along a roadway, so that the second road-based device can take appropriate action, such as warning other vehicles, pedestrians, or the like.

FIG. 3.126 is an example flow diagram of example logic illustrating an example embodiment of process 3.12500 of FIG. 3.125. More particularly, FIG. 3.126 illustrates a process 3.12600 that includes the process 3.12500, and which further includes operations performed by or at the following blocks(s).

At block 3.12602, the process performs causing the second road-based device to warn drivers that the first vehicle is driving erratically.

FIG. 3.127 is an example flow diagram of example logic illustrating an example embodiment of process 3.12500 of FIG. 3.125. More particularly, FIG. 3.127 illustrates a process 3.12700 that includes the process 3.12500, and which further includes operations performed by or at the following blocks(s).

At block 3.12702, the process performs causing the second road-based device to control a traffic control signal to inhibit a collision involving the first vehicle. For example, the second road-based device may change a signal from green to red in order to stop other vehicles from entering an intersection when it is determined that the first vehicle is running red lights.

FIG. 3.128 is an example flow diagram of example logic illustrating an example embodiment of process 3.100 of FIG. 3.1. More particularly, FIG. 3.128 illustrates a process 3.12800 that includes the process 3.100, and which further includes operations performed by or at the following blocks(s).

At block 3.12802, the process performs transmitting the threat information to a law enforcement entity. In some embodiments, the process shares the threat information with law enforcement entities, including computer or other information systems managed or operated by such entities. For example, if the process determines that the first vehicle is driving erratically, the process may transmit that determination and/or information about the first vehicle with the police.

FIG. 3.129 is an example flow diagram of example logic illustrating an example embodiment of process 3.12800 of FIG. 3.128. More particularly, FIG. 3.129 illustrates a process 3.12900 that includes the process 3.12800, and which further includes operations performed by or at the following blocks(s).

At block 3.12902, the process performs determining a license place identifier of the first vehicle based on the image data. The process may perform image processing (e.g., optical character recognition) to determine the license number on the license plate of the first vehicle.

At block 3.12904, the process performs transmitting the license plate identifier to the law enforcement entity.

FIG. 3.130 is an example flow diagram of example logic illustrating an example embodiment of process 3.12800 of FIG. 3.128. More particularly, FIG. 3.130 illustrates a process 3.13000 that includes the process 3.12800, and which further includes operations performed by or at the following blocks(s).

At block 3.13002, the process performs determining a vehicle description of the first vehicle based on the image data. Image processing may be utilized to determine a vehicle description, including one or more of type, make, year, and/or color of the first vehicle.

At block 3.13004, the process performs transmitting the vehicle description to the law enforcement entity.

FIG. 3.131 is an example flow diagram of example logic illustrating an example embodiment of process 3.12800 of FIG. 3.128. More particularly, FIG. 3.131 illustrates a process 3.13100 that includes the process 3.12800, and which further includes operations performed by or at the following blocks(s).

At block 3.13102, the process performs determining a location associated with the first vehicle. The process may reference a GPS system to determine the current location of the user and/or the first vehicle, and then provide an indication of that location to the police or other agency. The location may be or include a coordinate, a street or intersection name, a name of a municipality, or the like.

At block 3.13104, the process performs transmitting an indication of the location to the law enforcement entity.

FIG. 3.132 is an example flow diagram of example logic illustrating an example embodiment of process 3.12800 of FIG. 3.128. More particularly, FIG. 3.132 illustrates a process 3.13200 that includes the process 3.12800, and which further includes operations performed by or at the following blocks(s).

At block 3.13202, the process performs determining a direction of travel of the first vehicle. As discussed above, the process may determine direction of travel in various ways, such as by modeling the motion of the first vehicle. Such a direction may then be provided to the police or other agency, such as by reporting that the first vehicle is traveling northbound.

At block 3.13204, the process performs transmitting an indication of the direction of travel to the law enforcement entity.

3. Example Computing System Implementation

Figure 4:
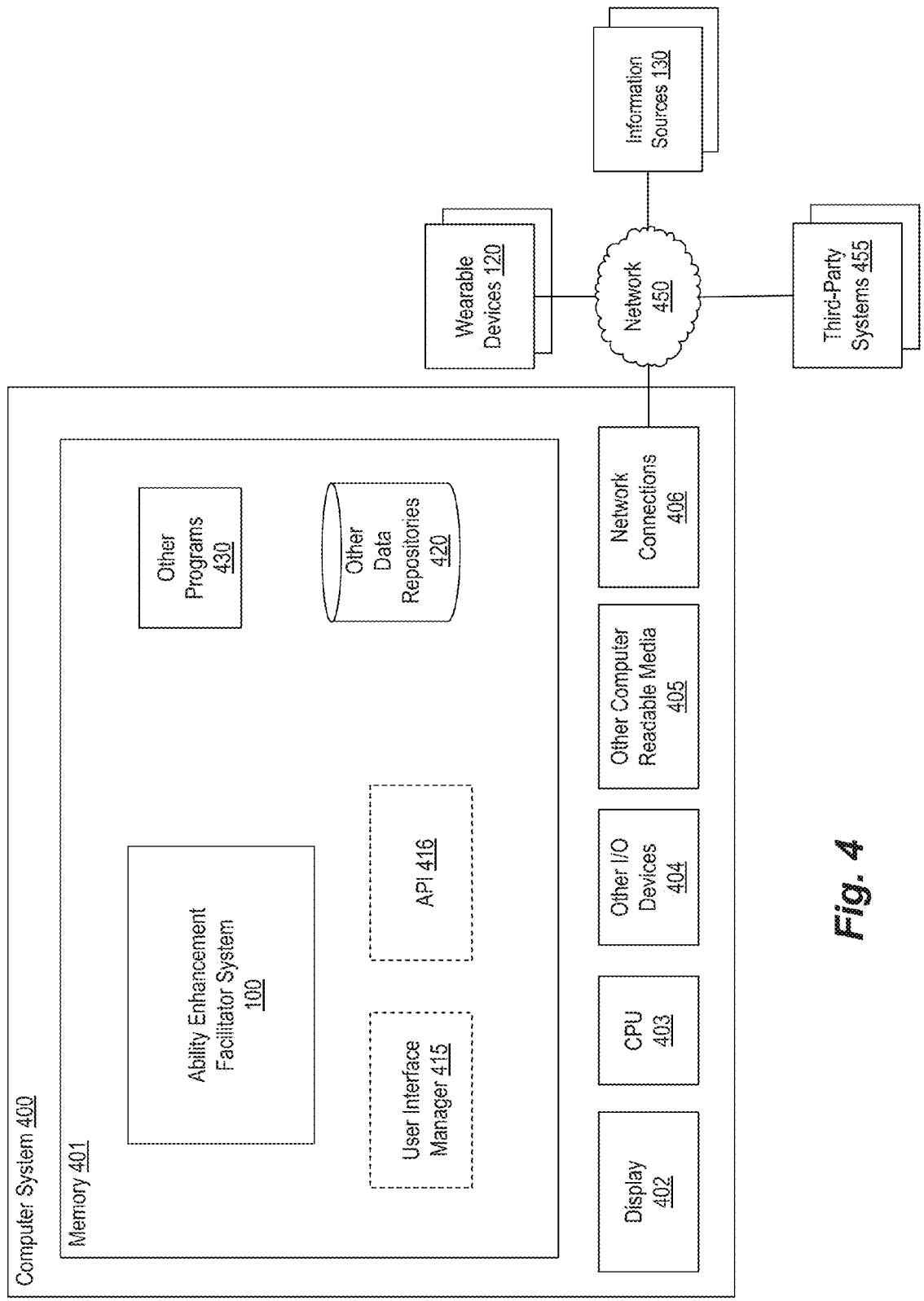
FIG. 4 is an example block diagram of an example computing system for implementing an ability enhancement facilitator system according to an example embodiment.

FIG. 4 is an example block diagram of an example computing system for implementing an ability enhancement facilitator system according to an example embodiment. In particular, FIG. 4 shows a computing system 400 that may be utilized to implement an AEFS 100.

Note that one or more general purpose or special purpose computing systems/devices may be used to implement the AEFS 100. In addition, the computing system 400 may comprise one or more distinct computing systems/devices and may span distributed locations. Furthermore, each block shown may represent one or more such blocks as appropriate to a specific embodiment or may be combined with other blocks. Also, the AEFS 100 may be implemented in software, hardware, firmware, or in some combination to achieve the capabilities described herein.

In the embodiment shown, computing system 400 comprises a computer memory ("memory") 401, a display 402, one or more Central Processing Units ("CPU") 403, Input/Output devices 404 (e.g., keyboard, mouse, CRT or LCD display, and the like), other computer-readable media 405, and network connections 406. The AEFS 100 is shown residing in memory 401. In other embodiments, some portion of the contents, some or all of the components of the AEFS 100 may be stored on and/or transmitted over the other computer-readable media 405. The components of the AEFS 100 preferably execute on one or more CPUs 403 and implement techniques described herein. Other code or programs 430 (e.g., an administrative interface, a Web server, and the like) and potentially other data repositories, such as data repository 420, also reside in the memory 401, and preferably execute on one or more CPUs 403. Of note, one or more of the components in FIG. 4 may not be present in any specific implementation. For example, some embodiments may not provide other computer readable media 405 or a display 402.

The AEFS 100 interacts via the network 450 with wearable devices 120, information sources 130, and third-party systems/applications 455. The network 450 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The third-party systems/applications 455 may include any systems that provide data to, or utilize data from, the AEFS 100, including Web browsers, vehicle-based client systems, traffic tracking, monitoring, or prediction systems, and the like.

The AEFS 100 is shown executing in the memory 401 of the computing system 400. Also included in the memory are a user interface manager 415 and an application program interface ("API") 416. The user interface manager 415 and the API 416 are drawn in dashed lines to indicate that in other embodiments, functions performed by one or more of these components may be performed externally to the AEFS 100.

The UI manager 415 provides a view and a controller that facilitate user interaction with the AEFS 100 and its various components. For example, the UI manager 415 may provide interactive access to the AEFS 100, such that users can configure the operation of the AEFS 100, such as by providing the AEFS 100 with information about common routes traveled, vehicle types used, driving patterns, or the like. The UI manager 415 may also manage and/or implement various output abstractions, such that the AEFS 100 can cause vehicular threat information to be displayed on different media, devices, or systems. In some embodiments, access to the functionality of the UI manager 415 may be provided via a Web server, possibly executing as one of the other programs 430. In such embodiments, a user operating a Web browser executing on one of the third-party systems 455 can interact with the AEFS 100 via the UI manager 415.

The API 416 provides programmatic access to one or more functions of the AEFS 100. For example, the API 416 may provide a programmatic interface to one or more functions of the AEFS 100 that may be invoked by one of the other programs 430 or some other module. In this manner, the API 416 facilitates the development of third-party software, such as user interfaces, plug-ins, adapters (e.g., for integrating functions of the AEFS 100 into vehicle-based client systems or devices), and the like.

In addition, the API 416 may be in at least some embodiments invoked or otherwise accessed via remote entities, such as code executing on one of the wearable devices 120, information sources 130, and/or one of the third-party systems/applications 455, to access various functions of the AEFS 100. For example, an information source 130 such as a radar gun installed at an intersection may push motion-related information (e.g., velocity) about vehicles to the AEFS 100 via the API 416. As another example, a weather information system may push current conditions information (e.g., temperature, precipitation) to the AEFS 100 via the API 416. The API 416 may also be configured to provide management widgets (e.g., code modules) that can be integrated into the third-party applications 455 and that are configured to interact with the AEFS 100 to make at least some of the described functionality available within the context of other applications (e.g., mobile apps).

In an example embodiment, components/modules of the AEFS 100 are implemented using standard programming techniques. For example, the AEFS 100 may be implemented as a "native" executable running on the CPU 403, along with one or more static or dynamic libraries. In other embodiments, the AEFS 100 may be implemented as instructions processed by a virtual machine that executes as one of the other programs 430. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the AEFS 100, such as in the data store 420 (or 240), can be available by standard mechanisms such as through C, C++, C#, and Java APIs; libraries for accessing files, databases, or other data repositories; through scripting languages such as XML; or through Web servers, FTP servers, or other types of servers providing access to stored data. The data store 420 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the AEFS 100 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

From the foregoing it will be appreciated that, although specific embodiments have been described herein for purposes of illustration, various modifications may be made without deviating from the spirit and scope of this disclosure. For example, the methods, techniques, and systems for ability enhancement are applicable to other architectures or in other settings. For example, instead of providing threat information to human users who are vehicle operators or pedestrians, some embodiments may provide such information to control systems that are installed in vehicles and that are configured to automatically take action to avoid collisions in response to such information. In addition, the techniques are not limited just to road-based vehicles (e.g., cars, bicycles), but are also applicable to airborne vehicles, including unmanned aerial vehicles (e.g., drones). Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

The invention claimed is:

1. A method for enhancing ability in a transportation-related context, the method comprising:
   receiving, from a road-based device, information about a first vehicle that is proximate to the road-based device;
   receiving, from a wearable device of a user, motion-related information about the user, the motion-related information including position information obtained from a position sensor of the wearable device;
   determining threat information based at least in part on the information about the first vehicle and the motion-related information about the user; and
   presenting the threat information via the wearable device of a user.

2. The method of claim 1, wherein the determining threat information includes: determining a likelihood that the first vehicle will collide with some other object.

3. The method of claim 2, wherein the determining a likelihood that the first vehicle will collide with some other object includes: determining a likelihood that the first vehicle will collide with the user.

4. The method of claim 2, wherein the determining a likelihood that the first vehicle will collide with some other object includes: determining that the likelihood that the first vehicle will collide with some other object is greater than a threshold.

5. The method of claim 1, wherein the determining threat information includes: determining that the first vehicle is driving with excessive speed.

6. The method of claim 5, wherein the determining that the first vehicle is driving with excessive speed includes: determining that the first vehicle is traveling more than a threshold percentage faster than an average speed of traffic on a road segment at a current time, wherein the average speed of traffic is measured over a time window preceding the current time.

7. The method of claim 5, wherein the determining that the first vehicle is driving with excessive speed includes: determining that the first vehicle is traveling at a speed that is more than a threshold number of standard deviations over an average speed of traffic on a road segment.

8. The method of claim 1, wherein the road-based device is a sensor attached to a structure proximate to the first vehicle.

9. The method of claim 8, wherein the structure proximate to the first vehicle is one of a utility pole, a traffic control signal support, and/or a building.

10. The method of claim 8, wherein the receiving information about a first vehicle includes: receiving an image of the first vehicle from a camera deployed at an intersection.

11. The method of claim 8, wherein the receiving information about a first vehicle includes: receiving ranging data from a range sensor deployed at an intersection, the ranging data representing a distance between the first vehicle and the intersection.

12. The method of claim 8, wherein the road-based device includes at least one of: a camera, a microphone, a radar-based speed sensor, light detection and ranging-based speed sensor, and/or a range sensor.

13. The method of claim 8, wherein the road-based device includes a receiver operable to receive motion-related information transmitted from the first vehicle, the motion-related information including at least one of a position of the first vehicle, a velocity of the first vehicle, and/or a trajectory of the first vehicle.

14. The method of claim 1, wherein the road-based device is embedded in a roadway being traveled over by the first vehicle.

15. The method of claim 14, wherein the road-based device includes one or more induction loops embedded in the roadway, the one or more induction loops configured to detect the presence and/or velocity of the first vehicle.

16. The method of claim 15, wherein the receiving information about a first vehicle includes: receiving motion-related information from the induction loop, the motion-related information including at least one of a position of the first vehicle, a velocity of the first vehicle, and/or a trajectory of the first vehicle.

17. The method of claim 1, wherein the receiving information about a first vehicle includes: receiving the information about the first vehicle from a sensor attached to the first vehicle.

18. The method of claim 1, wherein the receiving information about a first vehicle includes: receiving the information about the first vehicle from a sensor attached to a second vehicle.

19. The method of claim 18, wherein the second vehicle is an aerial vehicle.

20. The method of claim 19, wherein the aerial vehicle is a drone employed as an instrument platform configured to:
   travel over a road segment being traveled by the first vehicle; and
   track and provide information about the first vehicle.

21. The method of claim 1, wherein the receiving information about a first vehicle includes: receiving the information about the first vehicle from a sensor of the wearable device.

22. The method of claim 1, further comprising: receiving motion-related information about the first vehicle and/or other objects moving about a roadway.

23. The method of claim 1, wherein the receiving information about a first vehicle includes: receiving image data from a camera, the image data representing an image of the first vehicle.

24. The method of claim 23, wherein the receiving image data from a camera includes: receiving an image from a camera that is attached to a road-side structure or the wearable device.

25. The method of claim 1, wherein the receiving information about a first vehicle includes: receiving data representing an audio signal emitted or reflected by the first vehicle.

26. The method of claim 1, wherein the determining threat information includes: determining threat information that is not related to the first vehicle.

27. The method of claim 26, wherein the determining threat information that is not related to the first vehicle includes: determining that there is slow traffic in proximity to the user.

28. The method of claim 27, wherein the determining that there is slow traffic in proximity to the user includes: receiving information from a traffic information system regarding traffic congestion on a road traveled by the user.

29. The method of claim 27, wherein the determining that there is slow traffic in proximity to the user includes: determining that one or more vehicles are traveling slower than an average or posted speed for a road traveled by the user.

30. The method of claim 1, further comprising:
identifying multiple threats to the user;
identifying a first one of the multiple threats that is more significant than at least one other of the multiple threats; and
instructing the user to avoid the first one of the multiple threats.

31. The method of claim 1, wherein the presenting the threat information includes: presenting the threat information via an audio output device of the wearable device.

32. The method of claim 1, wherein the presenting the threat information includes: presenting the threat information via a visual display device of the wearable device.

33. The method of claim 32, wherein the presenting the threat information via a visual display device includes: displaying an indicator that instructs the user to look towards the first vehicle.

34. The method of claim 32, wherein the presenting the threat information via a visual display device includes: displaying an indicator that instructs the user to accelerate, decelerate, and/or turn.

35. The method of claim 1, further comprising: transmitting to the first vehicle a warning based on the threat information.

36. The method of claim 1, further comprising: presenting the threat information via an output device of a vehicle of the user, the output device including a visual display and/or an audio speaker.

37. The method of claim 1, wherein the wearable device is a helmet, goggles, eyeglasses, and/or a hat worn by the user.

38. The method of claim 1, further comprising:
performing at the road-based device the determining threat information and/or the presenting the threat information; and
transmitting the threat information from the road-based device to the wearable device of the user.

39. The method of claim 1, further comprising:
receiving data representing threat information relevant to a second vehicle, the second vehicle not being used for travel by the user; and
determining the threat information based on the data representing threat information relevant to the second vehicle.

40. The method of claim 39, wherein the receiving data representing threat information relevant to a second vehicle includes: receiving from the second vehicle at least one of an indication of stalled or slow traffic encountered by the second vehicle, an indication of poor driving conditions experienced by the second vehicle, an indication that the first vehicle is driving erratically, an image of the first vehicle.

41. The method of claim 1, further comprising: transmitting the threat information to a second vehicle.

42. The method of claim 41, wherein the transmitting the threat information to a second vehicle includes: transmitting the threat information to an intermediary server system for distribution to other vehicles in proximity to the user.

43. The method of claim 1, further comprising: transmitting the threat information to a second road-based device situated along a projected course of travel of the first vehicle.

44. The method of claim 43, further comprising: causing the second road-based device to warn drivers that the first vehicle is driving erratically.

45. The method of claim 43, further comprising: causing the second road-based device to control a traffic control signal to inhibit a collision involving the first vehicle.

46. A computing system for enhancing ability in a transportation-related context, the computing system comprising:
a processor;
a memory;
a module that is stored in the memory and that is configured, when executed by the processor, to perform a method comprising:
receiving, from a road-based device, information about a first vehicle that is proximate to the road-based device;
receiving, from a wearable device of a user, motion-related information about the user, the motion-related information including position information obtained from a position sensor of the wearable device;
determining threat information based at least in part on the information about the first vehicle and the motion-related information about the user; and
presenting the threat information via the wearable device of a user.

47. The computing system of claim 46, wherein the computing system is part of the wearable device.

* * * * *